US011642627B2

(12) United States Patent
Kosaka

(10) Patent No.: US 11,642,627 B2
(45) Date of Patent: May 9, 2023

(54) NANOCARBON SEPARATION DEVICE, NANOCARBON SEPARATION METHOD, AND ELECTRODE TUBE

(71) Applicant: NEC CORPORATION, Tokyo (JP)

(72) Inventor: Mayumi Kosaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 413 days.

(21) Appl. No.: 16/753,495

(22) PCT Filed: Oct. 10, 2017

(86) PCT No.: PCT/JP2017/036719
§ 371 (c)(1),
(2) Date: Apr. 3, 2020

(87) PCT Pub. No.: WO2019/073532
PCT Pub. Date: Apr. 18, 2019

(65) Prior Publication Data
US 2020/0316525 A1 Oct. 8, 2020

(51) Int. Cl.
*B01D 57/02* (2006.01)
*C01B 32/172* (2017.01)
(52) U.S. Cl.
CPC ............ *B01D 57/02* (2013.01); *C01B 32/172* (2017.08); *C01B 2202/22* (2013.01)
(58) Field of Classification Search
CPC .. B01D 57/02; B03C 5/00; B03C 5/02; C01B 32/15; C01B 32/172; C01B 2202/22
USPC .......................................... 204/450; 423/461
See application file for complete search history.

(56) References Cited

U.S. PATENT DOCUMENTS

2010/0189626 A1* 7/2010 Tanaka ................... B82Y 10/00
423/447.2

FOREIGN PATENT DOCUMENTS

| CN | 102928486 A | 2/2013 |
| JP | 2008-055375 A | 3/2008 |
| JP | 2012-036041 A | 2/2012 |
| JP | 5541283 B2 | 7/2014 |
| JP | 5717233 B2 | 5/2015 |
| JP | 2017-001919 A | 1/2017 |
| WO | 2008/143281 A1 | 11/2008 |
| WO | 2010/150808 A1 | 12/2010 |

OTHER PUBLICATIONS

Japanese Office Action for JP Application No. 2019-547824 dated Jan. 26, 2021 with English Translation.
International Search Report of PCT/JP2017/036719 dated Nov. 28, 2017 [PCT/ISA/210].

* cited by examiner

*Primary Examiner* — Tri V Nguyen
(74) *Attorney, Agent, or Firm* — Sughrue Mion, PLLC

(57) ABSTRACT

A nanocarbon separation device includes a separation tank which is configured to accommodate a dispersion liquid including a nanocarbon, a first electrode that is provided at an upper part in the separation tank, a second electrode that is provided at a lower part in the separation tank, and a plurality of electrode tubes that extend in the separation tank in a height direction of the separation tank. The second electrode is disposed at a lower end of the electrode tubes.

6 Claims, 16 Drawing Sheets

FIG. 14

NANOCARBON SEPARATION DEVICE, NANOCARBON SEPARATION METHOD, AND ELECTRODE TUBE

CROSS REFERENCE TO RELATED APPLICATIONS

This application is a National Stage of International Application No. PCT/JP2017/036719, filed Oct. 10, 2017.

TECHNICAL FIELD

The present invention relates to a nanocarbon separation device, a nanocarbon separation method, and an electrode tube.

BACKGROUND ART

Single-walled carbon nanotubes have high electron mobility and are expected to be applied to various fields due to their mechanical properties, electrical properties, chemical properties, and the like. Since single-walled carbon nanotubes are synthesized as a mixture of materials having different properties, including semiconducting and metallic properties, at a ratio of 2:1, it is necessary to perform separation for each property with high purity and rapidly for industrial applications.

As a method of separating a mixture of single-walled carbon nanotubes, for example, a nanocarbon material separation method including a step of introducing a dispersion liquid including nanocarbon materials dispersed in nanocarbon micelle groups having a plurality of different charges and a holding solution having a specific gravity different from that of the nanocarbon materials into an electrophoresis tank by laminating the solutions and arranging them in a predetermined direction, and a step of separating the nanocarbon micelle groups into two or more nanocarbon micelle groups by applying a direct current voltage in a serial direction to the introduced, arranged and laminated dispersion liquid and holding solution is known (for example, refer to Patent Document 1). In addition, a single-walled carbon nanotube separation method including a step in which a direct current voltage is applied to a single-walled carbon nanotube-containing micelle dispersion liquid in which single-walled carbon nanotubes are dispersed in a non-ionic surfactant solution in a vertically installed separation tank, and the mixture is separated into at least two layers including a single-walled carbon nanotube-containing micelle dispersion liquid layer in which metallic single-walled carbon nanotubes in which micelles have a positive charge as a whole are concentrated and a semiconducting single-walled carbon nanotube-containing micelle dispersion liquid layer in which micelles have a very weak charge as a whole, and in which a direct current voltage is applied to a negative electrode installed at an upper part and a positive electrode installed at a lower part in the separation tank, the direction of an electric field is upward and parallel to the direction of gravity is known (for example, refer to Patent Document 2).

PRIOR ART DOCUMENTS

Patent Documents

[Patent Document 1] Japanese Patent No. 5541283
[Patent Document 2] Japanese Patent No. 5717233

SUMMARY OF THE INVENTION

Problem to be Solved by the Invention

In the separation methods described in Patent Documents 1 and 2, when a direct current voltage is applied, electrolysis of water as a solvent occurs, and thus oxygen is generated at a positive electrode and hydrogen is generated at a negative electrode. The separation methods described in Patent Documents 1 and 2 have problems that a gas generated at the lower electrode forms bubbles and moves to the upper part of the separation tank, which significantly impairs the separation efficiency.

An object of the present invention is to provide a nanocarbon separation device, a nanocarbon separation method, and an electrode tube through which bubbles generated at an electrode, which significantly impair the separation efficiency in separation of a mixture of nanocarbons, are removed.

Means for Solving the Problem

A nanocarbon separation device of the present invention includes a separation tank which is configured to accommodate a dispersion liquid including a nanocarbon, a first electrode that is provided at an upper part in the separation tank, a second electrode that is provided at a lower part in the separation tank, and a plurality of electrode tubes that extend in the separation tank in a height direction of the separation tank, wherein the second electrode is disposed at a lower end of the electrode tubes.

A nanocarbon separation method of the present invention is a nanocarbon separation method using the nanocarbon separation device of the present invention, which includes a step of injecting a dispersion liquid including a nanocarbon into the separation tank, and a step of separating metallic nanocarbons and semiconducting nanocarbons included in the dispersion liquid by applying a direct current voltage to the first electrode and the second electrode.

An electrode tube of the present invention includes an insulating tubular member, an insulating columnar member that is inserted into the tubular member, and an electrode that circumscribes the columnar member, wherein an end of the tubular member has a tapered shape whose diameter gradually increases toward a tip of the tubular member, a side surface of an end of the columnar member disposed on an side of the end of the tubular member has a shape similar to that of an inner surface of the end of the tubular member, the electrode is disposed near the end of the columnar member, and the columnar member is capable of moving in a length direction of the tubular member while inserted into the tubular member.

Effect of the Invention

According to the present invention, in separation of a mixture of nanocarbons, it is possible to remove bubbles generated at the electrode, which significantly impair the separation efficiency.

BRIEF DESCRIPTION OF THE DRAWINGS

FIG. 14 is a perspective view showing a nanocarbon separation device of an eleventh example embodiment.

EMBODIMENTS FOR CARRYING OUT THE INVENTION

A nanocarbon separation device, a nanocarbon separation method, and an electrode tube according to example embodiments of the present invention will be described.

Here, the present example embodiment is described in detail in order for better understanding of the spirit of the present invention, and does not limit the present invention unless otherwise specified.

First Example Embodiment (Nanocarbon Separation Device and Electrode Tube)

Figure 1:
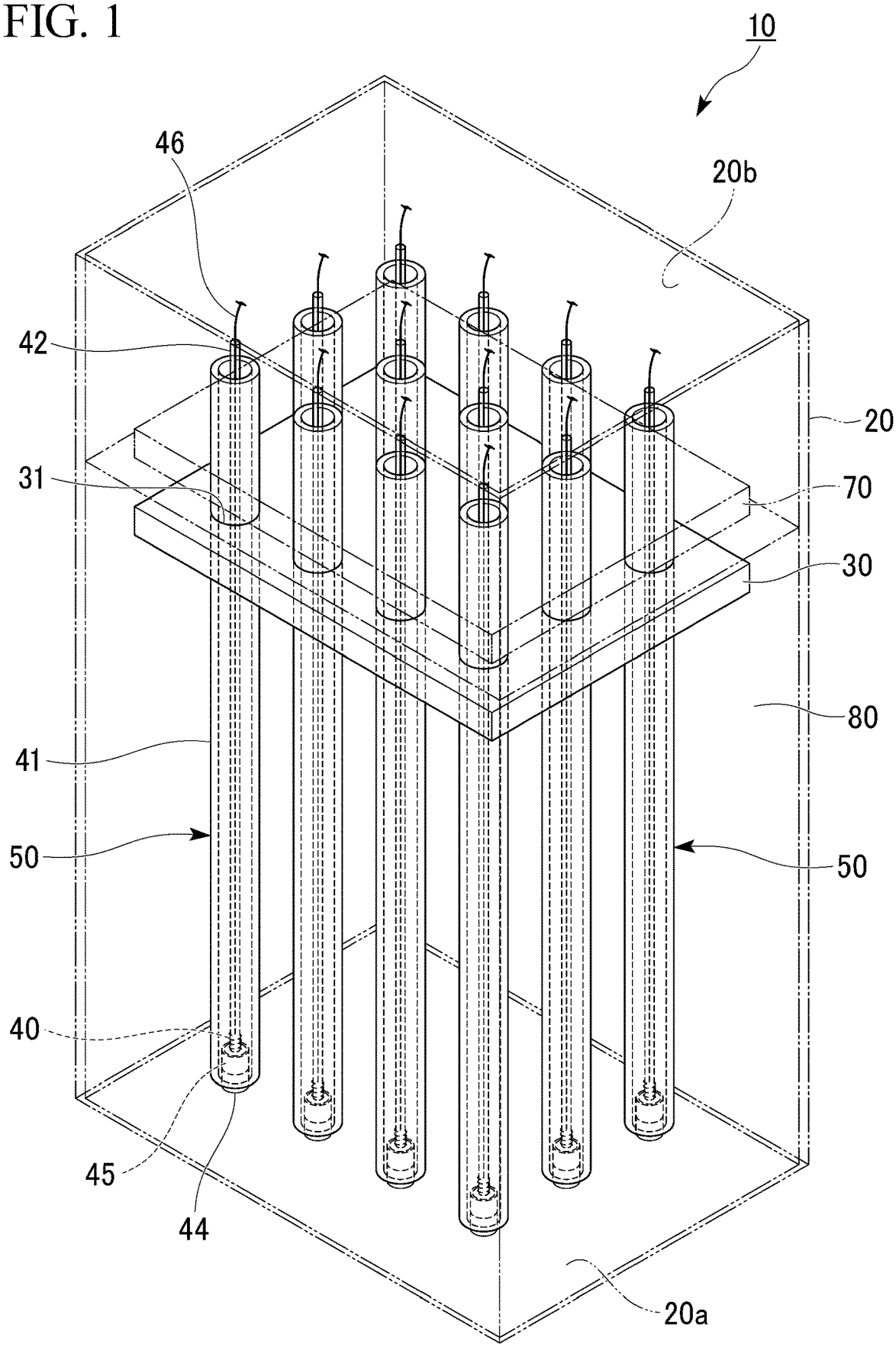
FIG. 1 is a perspective view showing a nanocarbon separation device of a first example embodiment.
Figure 2A:
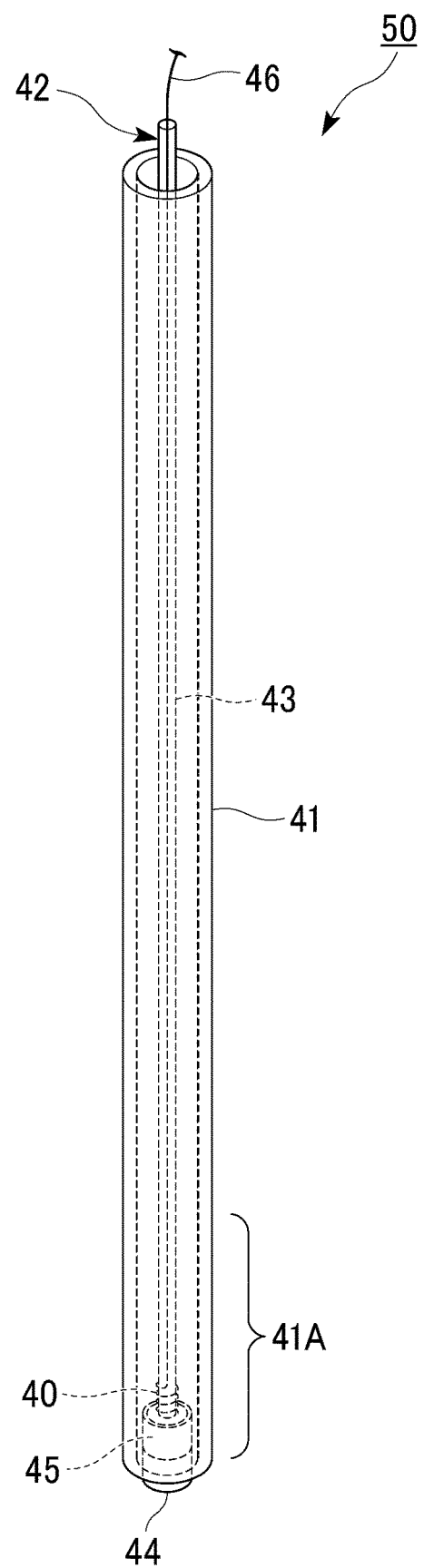
FIG. 2A is a perspective view showing an electrode tube in the nanocarbon separation device of the first example embodiment.
Figure 2B:
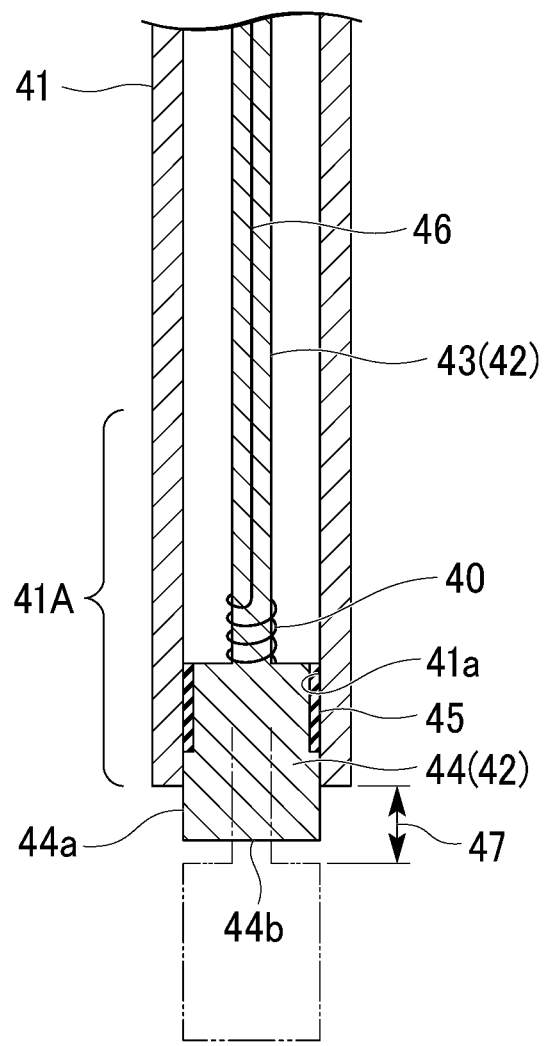
FIG. 2B is a cross-sectional view showing the electrode tube in the nanocarbon separation device of the first example embodiment.

FIG. 1 is a perspective view showing a nanocarbon separation device of the present example embodiment. FIG. 2A is a perspective view showing an electrode tube constituting the nanocarbon separation device of the present example embodiment. FIG. 2B is a cross-sectional view showing the electrode tube constituting the nanocarbon separation device of the present example embodiment.

A nanocarbon separation device 10 of the present example embodiment includes a separation tank (electrophoresis tank) 20, a first electrode 30 provided at an upper part in the separation tank 20, a second electrode 40 provided at a lower part in the separation tank 20, and a plurality of electrode tubes 50 that extend in the separation tank 20 in the height direction of the separation tank 20.

In the nanocarbon separation device 10 of the present example embodiment, the second electrode 40 is disposed at the lower end of the electrode tube 50. Here, the lower end of the electrode tube 50 is an end located on the side of an inner bottom surface 20a of the separation tank 20 in the electrode tube 50.

The first electrode 30 is disposed at an upper part in the height direction (in the separation tank 20, in a region higher than half of the height thereof, which is a region opposite to the inner bottom surface 20a of the separation tank 20) in the separation tank 20.

The second electrode 40 is disposed at a lower part in the height direction (in the separation tank 20, in a region lower than half of the height thereof, which is a region on the side of the inner bottom surface 20a of the separation tank 20) in the separation tank 20.

In the nanocarbon separation device 10 of the present example embodiment, for example, the first electrode 30 is a negative electrode, and the second electrode 40 is a positive electrode. In this case, when a direct current (DC) voltage is applied to the first electrode 30 and the second electrode 40, the direction of the electric field is directed from a bottom of the separation tank 20 upward.

The separation tank 20 has a rectangular shape when viewed from above in the height direction (hereinafter a view in this direction will be referred to as a "plan view").

The separation tank 20 has a space in which a dispersion liquid including a nanocarbon (hereinafter referred to as a "nanocarbon dispersion liquid") 80 can be accommodated. In the separation tank 20, the nanocarbon dispersion liquid 80 to be separated is accommodated, and a mixture of nanocarbons is separated through carrier-free electrophoresis. The shape and size of the separation tank 20 are not particularly limited as long as the separation tank 20 can accommodate the nanocarbon dispersion liquid 80.

The material of the separation tank 20 is not particularly limited as long as it is stable with respect to the nanocarbon dispersion liquid 80 and is an insulating material. Examples of materials of the separation tank 20 include glass, quartz, and acrylic resin.

The first electrode 30 and the second electrode 40 are not particularly limited as long as they can be used for carrier-free electrophoresis and are stable with respect to the nanocarbon dispersion liquid 80. Examples of the first electrode 30 and the second electrode 40 include a platinum electrode.

The first electrode 30 is disposed between the plurality of electrode tubes 50. In the nanocarbon separation device 10 of the present example embodiment, the structure of the first electrode 30 is not particularly limited as long as it is provided near the respective electrode tubes 50 in the upper part in the separation tank 20. The structure of the first electrode 30 is not particularly limited as long as it is disposed at upper parts of the plurality of electrode tubes 50 and disposed in a region outside the plurality of electrode tubes 50 in the separation tank 20. Examples of structures of the first electrode 30 and the second electrode 40 include an annular shape, a disk shape, and a rod shape in a plan view of the separation tank 20. In addition, examples of structures of the first electrode 30 and the second electrode 40 include a porous plate shape in which a plurality of fine pores are uniformly provided.

The electrode tubes 50 are arranged at equal intervals in a plan view of the separation tank 20.

The electrode tube 50 includes an insulating tubular member 41 and an insulating columnar member 42 inserted into the tubular member 41. The second electrode 40 circumscribes the columnar member 42 in the tubular member 41.

In FIG. 2A, the columnar member 42 includes a shaft member 43 that extends in the tubular member 41 and a tip member 44 that is integrally formed with one end of the shaft member 43, that is, an end on the side of the inner bottom surface 20*a* of the separation tank 20 in the shaft member 43. In other words, the tip member 44 projects from the tip of the shaft member 43.

In addition, the columnar member 42 can be moved in the length direction of the tubular member 41 while inserted into the tubular member 41.

Therefore, when the columnar member 42 is pulled (moved) up toward the upper part (toward the upper part of the separation tank 20) of the tubular member 41, the tip member 44 of the columnar member 42 can be inscribed in and fitted to a lower end 41A of the tubular member 41. On the other hand, when the columnar member 42 is pushed (moved) down toward the lower part of the tubular member 41 (toward the lower part of the separation tank 20), in FIG. 2B, as indicated by two dots-dashed lines, a gap 47 can be provided between the lower end 41A of the tubular member 41 and the tip member 44 of the columnar member 42.

On a side surface 44*a* of the tip member 44, an O-ring 45 made of an elastic component such as silicon rubber is preferably provided in at least a region on the side of the columnar member 42. Thus, when the columnar member 42 is pulled up toward the upper part of the tubular member 41, it is possible to improve the degree of adhesion of the side surface 44*a* of the tip member 44 to an inner surface 41*a* of the lower end 41A of the tubular member 41.

The second electrode 40 is disposed near the tip member 44 in the columnar member 42. More specifically, the second electrode 40 is made of a metal wire of platinum or the like wound around the tip member 44 in the shaft member 43. That is, one end of the metal wire forms the second electrode 40 near the tip member 44. In addition, a part of the metal wire other than the second electrode 40 is disposed so that it circumscribes the shaft member 43 and is led out of the tubular member 41.

The material of the tubular member 41 and the columnar member 42 is not particularly limited as long as it is stable with respect to the nanocarbon dispersion liquid 80 and is an insulating material. Examples of materials of the tubular member 41 and the columnar member 42 include glass, quartz, and an acrylic resin.

In the nanocarbon separation device 10 of the present example embodiment, as shown in FIG. 1, the plurality of electrode tubes 50 are preferably held by, for example, a holding member 70. Here, the holding member 70 has, for example, a rectangular plate shape in a plan view. Thereby, the electrode tube 50 having the second electrode 40 is stably disposed in the separation tank 20. In addition, in the holding member 70, a plurality of through-holes (not shown) are formed at equal intervals in a plan view of the holding member 70. When the electrode tubes 50 are inserted into the through-holes of the holding member 70, the plurality of electrode tubes 50 are arranged at equal intervals in a plan view of the holding member 70.

Here, the structure of the holding member 70 is not particularly limited as long as it can hold the plurality of electrode tubes 50 in the separation tank 20. The structure of the holding member 70 is not particularly limited as long as it is disposed at upper parts of the plurality of electrode tubes 50 and is disposed in a region outside the plurality of electrode tubes 50 in the separation tank 20.

The material of the holding member 70 is not particularly limited as long as it is stable with respect to the nanocarbon dispersion liquid 80 and is an insulating material. Examples of materials of the holding member 70 include glass, quartz, and an acrylic resin.

The nanocarbon separation device 10 of the present example embodiment may include an injection port (not shown) through which the nanocarbon dispersion liquid 80 is injected into the separation tank 20. The injection port may be provided at an upper part in the height direction (in the separation tank 20, in a region higher than half of the height thereof, a region opposite to the inner bottom surface 20*a* of the separation tank 20) in the separation tank 20. When the upper end of the separation tank 20 is an opening 20*b*, the opening 20*b* may be an injection port through which the nanocarbon dispersion liquid 80 is injected into the separation tank 20.

The nanocarbon separation device 10 of the present example embodiment may include a recovery port (not shown) through which the nanocarbon dispersion liquid 80 in the separation tank 20 is recovered. The recovery port may be provided near the second electrode 40. That is, the recovery port may be provided at a lower part in the height direction (in the separation tank 20, in a region lower than half of the height thereof, a region on the side of the inner bottom surface 20*a* of the separation tank 20) in the separation tank 20.

In addition, in a nanocarbon separation method using the nanocarbon separation device 10 to be described below, when a temperature gradient occurs in the separation tank 20, a convection phenomenon of the nanocarbon dispersion liquid 80 may occur in the separation tank 20. As a result, it is not possible to stably separate metallic nanocarbons and semiconducting nanocarbons contained in the nanocarbon dispersion liquid 80. Here, the nanocarbon separation device 10 preferably includes a temperature adjusting unit for keeping the temperature of the nanocarbon dispersion liquid 80 in the separation tank 20 constant. The temperature adjusting unit is not particularly limited as long as it can keep the temperature of a liquid accommodated in a container constant, and, for example, any unit such as mounting a water cooling jacket can be used.

While a case in which the first electrode 30 is a negative electrode and the second electrode 40 is a positive electrode has been provided as an exemplary of the nanocarbon separation device 10 of the present example embodiment, the nanocarbon separation device 10 of the present example embodiment is not limited thereto. In the nanocarbon separation device 10 of the present example embodiment, the first electrode 30 may be a positive electrode and the second electrode 40 may be a negative electrode.

According to the nanocarbon separation device 10 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, it is possible to prevent the occurrence of a convection phenomenon of the nanocarbon dispersion liquid 80 due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons contained in the nanocarbon dispersion liquid 80 outside the electrode tube 50 in the separation tank 20 quickly and efficiently.

In addition, according to the nanocarbon separation device 10 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, since a horizontal flow is blocked by the plurality of electrode tubes 50, and thus the occurrence of a horizontal flow in the nanocarbon dispersion liquid 80 can be inhibited, it is possible to separate metallic nanocarbons and semiconducting nanocarbons quickly and efficiently.

In addition, according to the nanocarbon separation device 10 of the present example embodiment, when the first electrode 30 (negative electrode) is provided at an upper part in the separation tank 20, and the second electrode 40 (positive electrode) is provided at a lower part in the separation tank 20, for example, in a step of separating metallic nanocarbons and semiconducting nanocarbons contained in the nanocarbon dispersion liquid 80 which is performed in a nanocarbon separation method to be described below, since the amount of metallic nanocarbons increases near the first electrode 30 and the amount of semiconducting nanocarbons increases near the second electrode 40, it is possible to stably separate metallic nanocarbons and semiconducting nanocarbons.

Here, when the first electrode 30 is a positive electrode and the second electrode 40 is a negative electrode, in a step of separating metallic nanocarbons and semiconducting nanocarbons contained in the nanocarbon dispersion liquid 80, since the amount of semiconducting nanocarbons increases near the first electrode 30 and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 10 will be described and also operations of the nanocarbon separation device 10 will be described with reference to FIG. 1, FIG. 2A, FIG. 2B, and FIG. 3.

Figure 3:
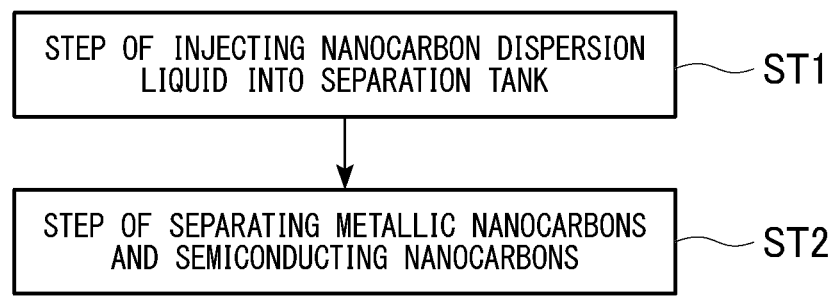
FIG. 3 is a flowchart showing a nanocarbon separation method of the present invention.

FIG. 3 is a flowchart showing a nanocarbon separation method of the present example embodiment.

The nanocarbon separation method of the present example embodiment includes a step of injecting the nanocarbon dispersion liquid 80 into the separation tank 20 (hereinafter referred to as an "injection step") and a step of separating metallic nanocarbons and semiconducting nanocarbons contained in the nanocarbon dispersion liquid 80 by applying a direct current voltage to the first electrode 30 and the second electrode 40 (hereinafter referred to as a "separation step").

In the nanocarbon separation method of the present example embodiment, when the electrode tube 50 including the first electrode 30 and the second electrode 40 is installed in the separation tank 20, the tip member 44 of the columnar member 42 is fitted to the lower end 41A of the tubular member 41. In this state, an electrode solution is injected into the tubular member 41. The electrode solution is, for example, a solution containing a surfactant and a dispersion medium contained in the nanocarbon dispersion liquid 80. The amount of the electrode solution injected is an amount at which, when the electrode tube 50 is installed in the separation tank 20, the liquid level of the electrode solution in the tubular member 41 is equal to or higher than the liquid level of the nanocarbon dispersion liquid 80 in the separation tank 20. Thereby, in a separation step to be described below, even if the gap 47 is provided between the lower end 41A of the tubular member 41 and the tip member 44 of the columnar member 42, it is possible to prevent the nanocarbon dispersion liquid 80 from entering the tubular member 41.

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding configuration. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared.

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$C_nH_{2n}(OCH_2CH_2)_mOH \tag{1}$$

(here, n=12 to 18, m=20 to 100)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij S100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40) isooctyl phenyl ether (molecular formula: $C_8H_{17}C_6H_{40}(CH_2CH_{20})_{40}H$, product name: Triton X-405, commercially available from Sigma-Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100, commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 0.1 wt % or more, a pH gradient of the single-walled carbon nanotube dispersion liquid can be formed in the separation tank 20 through carrier-free electrophoresis. On the other hand, when the amount of the non-ionic surfactant is 5 wt % or less, the viscosity of the single-walled carbon nanotube dispersion liquid does not become too high, metallic single-walled carbon nanotubes and semiconducting single-walled carbon nanotubes contained in the single-walled carbon nanotube dispersion liquid can be easily separated through carrier-free electrophoresis.

The amount of single-walled carbon nanotubes in the single-walled carbon nanotube dispersion liquid is preferably 1 µg/mL or more and 100 µg/mL or less and more preferably 5 µg/mL or more and 40 µg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through carrier-free electrophoresis.

A method of preparing a single-walled carbon nanotube dispersion liquid is not particularly limited, and a known method is used. For example, a method in which a mixed solution of a dispersion medium containing a mixture of single-walled carbon nanotubes and a surfactant is subjected to an ultrasonic treatment and the mixture of single-walled carbon nanotubes is dispersed in the dispersion medium is an exemplary example. According to this ultrasonic treatment, the aggregated metallic single-walled carbon nanotubes and semiconducting single-walled carbon nanotubes are sufficiently separated, and in the single-walled carbon nanotube dispersion liquid, metallic single-walled carbon nanotubes and semiconducting single-walled carbon nanotubes are uniformly dispersed in the dispersion medium. Therefore, metallic single-walled carbon nanotubes and semiconducting single-walled carbon nanotubes are easily separated through carrier-free electrophoresis to be described below. Here, metallic single-walled carbon nanotubes and semiconducting single-walled carbon nanotubes that are not dispersed according to an ultrasonic treatment are preferably separated and removed through ultracentrifugation.

Next, in the injection step, the single-walled carbon nanotube dispersion liquid prepared as described above is injected into the separation tank 20 (ST1).

In addition, when the single-walled carbon nanotube dispersion liquid is injected into the separation tank 20, the first electrode 30 and the second electrode 40 are brought into contact with the single-walled carbon nanotube dispersion liquid. In the present example embodiment, the first electrode 30 and the second electrode 40 are immersed in the single-walled carbon nanotube dispersion liquid.

Next, in the separation step, metallic single-walled carbon nanotubes and semiconducting single-walled carbon nanotubes contained in the single-walled carbon nanotube dispersion liquid are separated through carrier-free electrophoresis (ST2).

In the separation step, when the columnar member 42 is moved toward the lower part of the tubular member 41, the gap 47 is provided between the lower end 41A of the tubular member 41 and the tip member 44 of the columnar member 42. In this state, through carrier-free electrophoresis, metallic single-walled carbon nanotubes and semiconducting single-walled carbon nanotubes contained in the single-walled carbon nanotube dispersion liquid are separated. Here, even if the tip member 44 is disposed below the tubular member 41 so that the gap 47 is provided between the lower end 41A of the tubular member 41 and the tip member 44 of the columnar member 42, the second electrode 40 is preferably provided so that the second electrode 40 is in the tubular member 41.

When a direct current voltage is applied to the first electrode 30 and the second electrode 40 for a predetermined time (for example, 1 hour to 24 hours), an electric field is formed in the separation tank 20. Specifically, the electric field is formed so that the direction of the electric field is directed from a bottom of the separation tank 20 upward. Due to an electrophoretic force generated by the electric field and the charge of single-walled carbon nanotubes, a mixture of single-walled carbon nanotubes contained in the single-walled carbon nanotube dispersion liquid are separated into metallic single-walled carbon nanotubes and semiconducting single-walled carbon nanotubes.

In the single-walled carbon nanotube dispersion liquid containing a non-ionic surfactant, metallic single-walled carbon nanotubes have a positive charge, and semiconducting single-walled carbon nanotubes have a very weak negative charge.

Thus, when a direct current voltage is applied to the first electrode 30 and the second electrode 40, in the mixture of single-walled carbon nanotubes contained in the single-walled carbon nanotube dispersion liquid, metallic single-walled carbon nanotubes move toward the first electrode 30 (negative electrode) and semiconducting single-walled carbon nanotubes move toward the second electrode 40 (positive electrode). As a result, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C").

In the present example embodiment, the dispersion liquid phase A is formed on the side of the first electrode 30, and the dispersion liquid phase B is formed on the side of the second electrode 40.

A direct current voltage applied to the first electrode 30 and the second electrode 40 is not particularly limited, and is appropriately adjusted according to a distance between the first electrode 30 and the second electrode 40, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 30 and the second electrode 40 has any value that is larger than 0 V and equal to or less than 1,000 V.

For example, when a distance between the first electrode 30 and the second electrode 40 (inter-electrode distance) is 30 cm, a direct current voltage applied to the first electrode 30 and the second electrode 40 is preferably 15 V or more and 450 V or less and more preferably 30 V or more and 300 V or less.

When a direct current voltage applied to the first electrode 30 and the second electrode 40 is 15 V or more, a pH gradient of the single-walled carbon nanotube dispersion liquid is formed in the separation tank 20, and it is possible to separate metallic single-walled carbon nanotubes and semiconducting single-walled carbon nanotubes contained in the single-walled carbon nanotube dispersion liquid. On the other hand, when a direct current voltage applied to the first electrode 30 and the second electrode 40 is 450 V or less, the influence of electrolysis of water or heavy water is reduced.

In addition, when a direct current voltage is applied to the first electrode 30 and the second electrode 40, the electric field between the first electrode 30 and the second electrode 40 is preferably 0.5 V/cm or more and 15 V/cm or less and more preferably 1 V/cm or more and 10 V/cm or less.

When the electric field between the first electrode 30 and the second electrode 40 is 0.5 V/cm or more, a pH gradient of the single-walled carbon nanotube dispersion liquid is formed in the separation tank 20, and it is possible to separate metallic single-walled carbon nanotubes and semiconducting single-walled carbon nanotubes contained in the single-walled carbon nanotube dispersion liquid. On the other hand, when the electric field between the first electrode 30 and the second electrode 40 is 15 V/cm or less, the influence of electrolysis of water or heavy water is reduced.

In addition, when a direct current voltage is applied to the first electrode 30 and the second electrode 40, water or heavy water is electrolyzed, hydrogen or deuterium is generated at the first electrode 30, and oxygen is generated at the second electrode 40. In a conventional separation method, when oxygen generated at the second electrode 40 forms bubbles and moves to the upper part of the separation tank 20, a convection phenomenon of the single-walled carbon nanotube dispersion liquid during separation may occur. Therefore, in the nanocarbon separation method of the present example embodiment, a direct current voltage is applied to the first electrode 30 and the second electrode 40 when the gap 47 is provided between the lower end 41A of the tubular member 41 and the tip member 44 of the columnar member 42, metallic single-walled carbon nanotubes and semiconducting single-walled carbon nanotubes contained in the single-walled carbon nanotube dispersion liquid are separated through carrier-free electrophoresis. Then, oxygen generated at the second electrode 40 rises inside the tubular member 41 of the electrode tube 50 and exits the separation tank 20 from the upper end of the tubular member 41. In addition, the electrode solution in the tubular member 41 and the first electrode 30 are not in contact with each other. Accordingly, in the electrode solution in the tubular member 41, there is no potential difference between the first electrode 30 and the second electrode 40. On the other hand, in the single-walled carbon nanotube dispersion liquid outside the tubular member 41, there is a potential difference between the first electrode 30 and the second electrode 40. Thereby, in the nanocarbon separation method of the present example embodiment, separation of metallic single-walled carbon nanotubes and semiconducting single-walled carbon nanotubes contained in the single-walled carbon nanotube dispersion liquid proceeds in the single-walled carbon nanotube dispersion liquid accommodated in the separation tank 20 and outside the electrode tube 50. In addition, since bubbles generated at the second electrode 40 do not pass through the single-walled carbon nanotube dispersion liquid, it is possible to prevent the occurrence of a convection phenomenon of the single-walled carbon nanotube dispersion liquid during separation due to oxygen bubbles generated at the second electrode 40.

In addition, when separation of metallic single-walled carbon nanotubes and semiconducting single-walled carbon nanotube starts through carrier-free electrophoresis, the metallic single-walled carbon nanotubes and the semiconducting single-walled carbon nanotube move in the height direction of the separation tank 20 and also move in a direction perpendicular to the height direction of the separation tank 20. Thereby, a flow occurs in a direction (horizontal direction) perpendicular to the height direction of the separation tank 20 in the single-walled carbon nanotube dispersion liquid. When a horizontal flow occurs in the single-walled carbon nanotube dispersion liquid, a time required for the separation of the phase of the single-walled carbon nanotube dispersion liquid into the dispersion liquid phase A and the dispersion liquid phase B increases. In particular, when the inner diameter of the separation tank 20 increases as the volume of the separation tank 20 increases, a time required for phase separation increases. In the present example embodiment, the plurality of electrode tubes 50 are provided in the separation tank 20 and the interior of the separation tank 20 is partitioned into a plurality of regions. Thereby, in the separation step, when the phase of the single-walled carbon nanotube dispersion liquid is separated in the separation tank 20 through carrier-free electrophoresis, the occurrence of a horizontal flow in the single-walled carbon nanotube dispersion liquid can be inhibited by the plurality of electrode tubes 50. As a result, even if the separation tank 20 having a large inner diameter is used, the phase of the single-walled carbon nanotube dispersion liquid can be separated into the dispersion liquid phase A and the dispersion liquid phase B quickly and efficiently.

Next, the separated dispersion liquid phase A and dispersion liquid phase B are recovered (isolated).

The recovery method is not particularly limited, and any method in which the dispersion liquid phase A and the dispersion liquid phase B are not mixed by diffusion may be used.

Examples of recovery methods include a method in which application of a direct current voltage to the first electrode 30 and the second electrode 40 is stopped, and a small amount is gently sucked from each phase with a pipette.

In addition, examples of recovery methods include a method in which, while a direct current voltage is applied to the first electrode 30 and the second electrode 40, the single-walled carbon nanotube dispersion liquid of the dispersion liquid phase A is continuously sucked from a recovery port provided below the separation tank 20, and the single-walled carbon nanotube dispersion liquid of the dispersion liquid phase B is continuously sucked from the recovery port.

The recovered dispersion liquid is accommodated again in the separation tank 20, the operation of separating metallic single-walled carbon nanotubes and semiconducting single-walled carbon nanotubes contained in the single-walled carbon nanotube dispersion liquid through carrier-free electrophoresis is repeatedly performed in the same manner as described above, and thus it is possible to obtain highly pure metallic single-walled carbon nanotubes and semiconducting single-walled carbon nanotubes.

The separation efficiency of the recovered dispersion liquid can be evaluated through a technique such as microscopic Raman spectroscopy (change in Raman spectrums in a radial breathing mode (RBM) region, and change in a Raman spectrum shape in a Breit-Wigner-Fano (BWF) region), and ultraviolet-visible-near-infrared absorption spectrophotometry (change in peak shape of absorption spectrum). In addition, the separation efficiency of the dispersion liquid can also be evaluated by evaluating electrical properties of single-walled carbon nanotubes. For example, the separation efficiency of the dispersion liquid can be evaluated by producing a field effect transistor and measuring its transistor characteristics.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles which are generated at the second electrode 40 and significantly impair the separation efficiency. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid can be inhibited by the plurality of electrode tubes 50, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 30 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 30 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Second Example Embodiment (Nanocarbon Separation Device)

Figure 4:
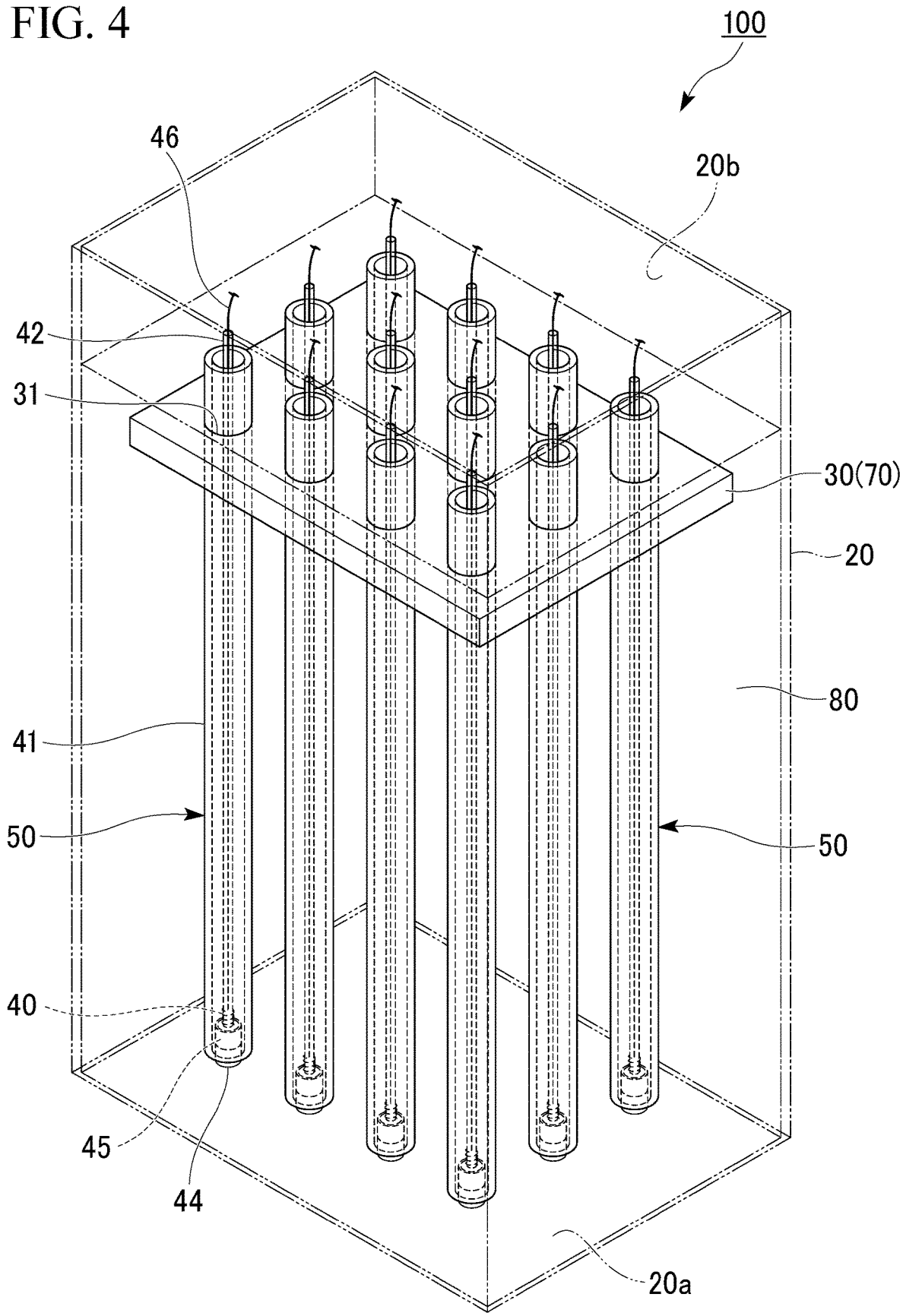
FIG. 4 is a perspective view showing a nanocarbon separation device of a second example embodiment.

FIG. 4 is a perspective view showing a nanocarbon separation device of the present example embodiment.

Here, in FIG. 4, components the same as those of the nanocarbon separation device of the first example embodiment shown in FIG. 1 will be denoted with the same reference numerals and redundant descriptions will be omitted.

A nanocarbon separation device 100 of the present example embodiment includes a separation tank (electrophoresis tank) 20, a first electrode 30 provided at an upper part in the separation tank 20, a second electrode 40 provided at a lower part in the separation tank 20, and a plurality of electrode tubes 50 that extend in the separation tank 20 in the height direction of the separation tank 20.

The nanocarbon separation device 100 of the present example embodiment is different from the nanocarbon separation device 10 of the first example embodiment in that the first electrode 30 and the holding member 70 are integrated.

That is, the first electrode 30 (the holding member 70) is disposed between the plurality of electrode tubes 50 and holds the electrode tubes 50. In the nanocarbon separation device 100 of the present example embodiment, as shown in FIG. 4, the first electrode 30 is a plate electrode having a rectangular shape in a plan view. In addition, the first electrode 30 has a plurality of through-holes 31 that penetrate therethrough in the thickness direction. The plurality of through-holes 31 are preferably arranged at equal intervals in a plan view of the first electrode 30. The electrode tube 50 is inserted and fitted into the through-hole 31 of the first electrode 30. Thereby, the electrode tube 50 having the second electrode 40 is disposed in the separation tank 20. In addition, when the plurality of through-holes 31 are arranged at equal intervals in a plan view of the first electrode 30, the electrode tubes 50 are arranged at equal intervals in a plan view of the first electrode 30.

The nanocarbon separation device 100 of the present example embodiment may include an injection port (not shown) through which the nanocarbon dispersion liquid 80 is injected into the separation tank 20 as in the first example embodiment.

In addition, the nanocarbon separation device 100 of the present example embodiment may include a recovery port (not shown) through which the nanocarbon dispersion liquid 80 in the separation tank 20 is recovered as in the first example embodiment.

The nanocarbon separation device 100 of the present example embodiment preferably includes a temperature adjusting unit configured to keep the temperature of the nanocarbon dispersion liquid 80 in the separation tank 20 constant as in the first example embodiment.

While a case in which the first electrode 30 is a negative electrode and the second electrode 40 is a positive electrode has been provided as an exemplary of the nanocarbon separation device 100 of the present example embodiment, the nanocarbon separation device 100 of the present example embodiment is not limited thereto. In the nanocarbon separation device 100 of the present example embodiment, the first electrode 30 may be a positive electrode and the second electrode 40 may be a negative electrode.

According to the nanocarbon separation device 100 of the present example embodiment, since the first electrode 30 and the holding member 70 are integrated, it is possible to simplify the structures of the first electrode 30 and the holding member 70 in the separation tank 20. Thereby, in the separation tank 20, it is possible to secure a sufficient space in which the nanocarbon dispersion liquid 80 is accommodated.

According to the nanocarbon separation device 100 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, it is possible to prevent the occurrence of a convection phenomenon of the nanocarbon dispersion liquid 80 due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons outside the electrode tube 50 in the separation tank 20 quickly and efficiently.

In addition, according to the nanocarbon separation device 100 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, since a horizontal flow is blocked by the plurality of electrode tubes 50, and thus the occurrence of a horizontal flow in the nanocarbon dispersion liquid 80 can be inhibited, it is possible to separate metallic nanocarbons and semiconducting nanocarbons quickly and efficiently.

In addition, according to the nanocarbon separation device 100 of the present example embodiment, when the first electrode 30 (negative electrode) is provided at an upper part in the separation tank 20, and the second electrode 40 (positive electrode) is provided at a lower part in the separation tank 20, for example, in a step of separating metallic nanocarbons and semiconducting nanocarbons contained in the nanocarbon dispersion liquid 80 which is performed in a nanocarbon separation method to be described below, since the amount of metallic nanocarbons increases near the first electrode 30 and the amount of semiconducting nanocarbons increases near the second electrode 40, it is possible to stably separate metallic nanocarbons and semiconducting nanocarbons.

Here, when the first electrode 30 is a positive electrode and the second electrode 40 is a negative electrode, in a step of separating metallic nanocarbons and semiconducting nanocarbons contained in the nanocarbon dispersion liquid 80, since the amount of semiconducting nanocarbons increases near the first electrode 30 and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 100 will be described and also operations of the nanocarbon separation device 100 will be described with reference to FIG. 4.

As in the first example embodiment, the nanocarbon separation method of the present example embodiment includes a step of injecting the nanocarbon dispersion liquid 80 into the separation tank 20 (injection step) and a step of separating metallic nanocarbons and semiconducting nanocarbons contained in the nanocarbon dispersion liquid 80 by applying a direct current voltage to the first electrode 30, and the second electrode 40 (separation step).

In the injection step, when the nanocarbon dispersion liquid 80 is injected into the separation tank 20, the first electrode 30 and the second electrode 40 are brought into contact with the nanocarbon dispersion liquid 80. In the present example embodiment, the first electrode 30 and the second electrode 40 are immersed in the nanocarbon dispersion liquid 80.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles which are generated at the second electrode 40 and significantly impair the separation efficiency. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid can be inhibited by the plurality of electrode tubes 50, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 30 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary example in the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 30 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Third Example Embodiment (Nanocarbon Separation Device)

Figure 5:
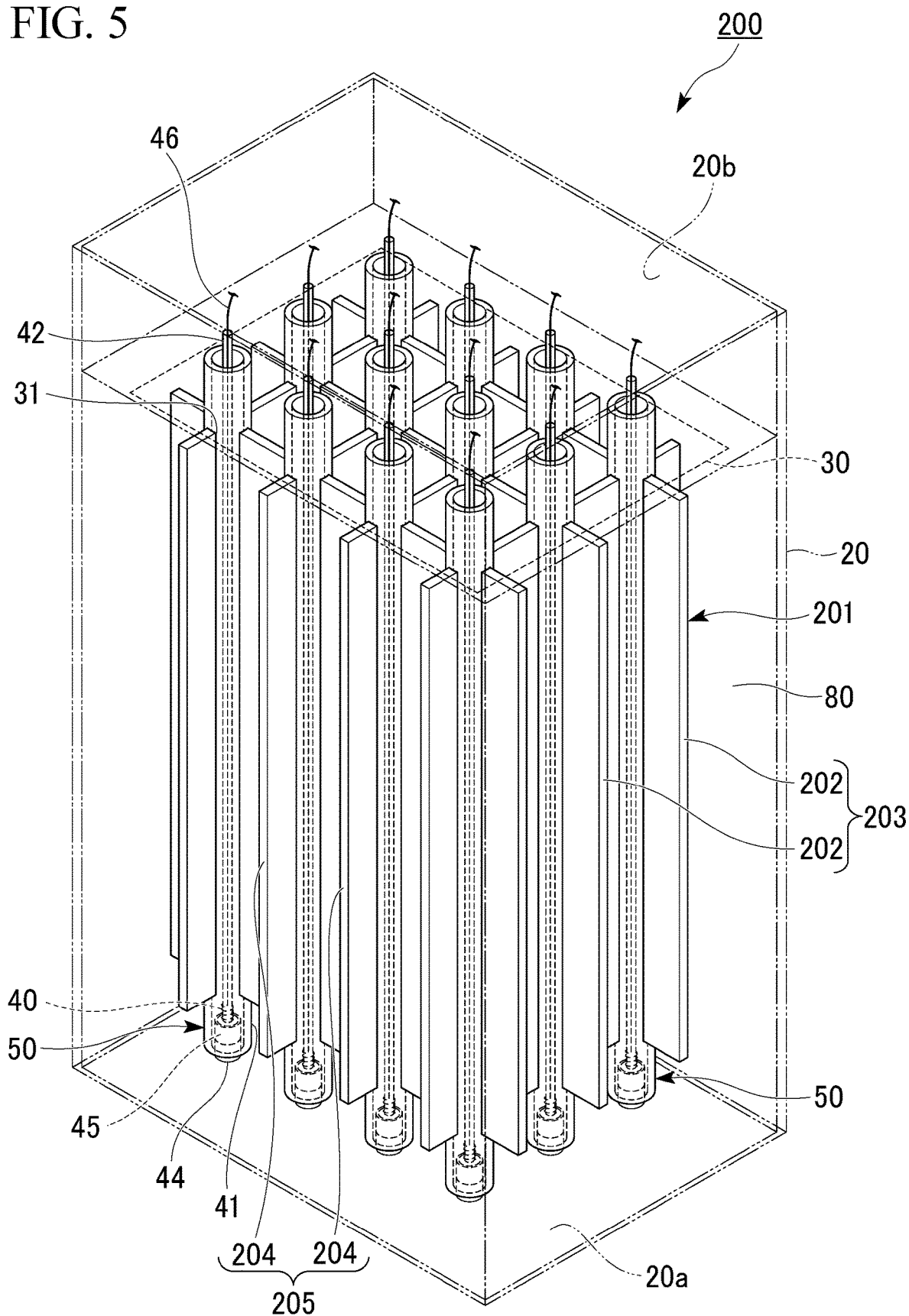
FIG. 5 is a perspective view showing a nanocarbon separation device of a third example embodiment.

FIG. 5 is a perspective view showing a nanocarbon separation device of the present example embodiment.

Here, in FIG. 5, components the same as those of the nanocarbon separation device of the first example embodiment shown in FIG. 1 will be denoted with the same reference numerals and redundant descriptions will be omitted.

A nanocarbon separation device 200 of the present example embodiment includes a separation tank (electrophoresis tank) 20, a first electrode 30 provided at an upper part in the separation tank 20, a second electrode 40 provided at a lower part in the separation tank 20, and a plurality of electrode tubes 50 that extend in the separation tank 20 in the height direction of the separation tank 20.

The nanocarbon separation device 200 of the present example embodiment is different from the nanocarbon separation device 10 of the first example embodiment in that a holding member 201 that holds the plurality of electrode tubes 50 includes, as shown in FIG. 5, a first member group 203 including a plurality of flat first members 202 that are arranged in the horizontal direction of the separation tank 20 and a second member group 205 which vertically intersects the first member group 203 and includes a plurality of flat second members 204 that are arranged in the horizontal direction of the separation tank 20. The interior of the separation tank 20 is partitioned into a plurality of regions by the holding member 201. In other words, the separation tank 20 is partitioned into grid spaces in a plan view by the holding member 201. In addition, the first member 202 and the second member 204 extend in the vertical direction of the separation tank 20.

The electrode tube 50 is provided at a part in which the first member 202 and the second member 204 intersect. Thereby, the electrode tubes 50 are arranged at equal intervals in a plan view of the separation tank 20.

Here, in the nanocarbon separation device 200 of the present example embodiment, the structure of the first member 202 and the second member 204 is not limited to a flat shape. The structure of the first member 202 and the second member 204 may be a porous plate shape in which a plurality of fine pores are uniformly provided.

The nanocarbon separation device 200 of the present example embodiment may include an injection port (not shown) through which the nanocarbon dispersion liquid 80 is injected into the separation tank 20 as in the first example embodiment.

In addition, the nanocarbon separation device 200 of the present example embodiment may include a recovery port (not shown) through which the nanocarbon dispersion liquid 80 in the separation tank 20 is recovered as in the first example embodiment.

The nanocarbon separation device 200 of the present example embodiment preferably includes a temperature adjusting unit configured to keep the temperature of the nanocarbon dispersion liquid 80 in the separation tank 20 constant as in the first example embodiment.

While a case in which the first electrode 30 is a negative electrode and the second electrode 40 is a positive electrode has been provided as an exemplary of the nanocarbon separation device 200 of the present example embodiment, the nanocarbon separation device 200 of the present example embodiment is not limited thereto. In the nanocarbon separation device 200 of the present example embodiment, the first electrode 30 may be a positive electrode and the second electrode 40 may be a negative electrode.

According to the nanocarbon separation device 200 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, it is possible to prevent the occurrence of a convection phenomenon of the nanocarbon dispersion liquid 80 due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons outside the electrode tube 50 in the separation tank 20 quickly and efficiently.

In addition, according to the nanocarbon separation device 200 of the present example embodiment, when the holding member 201 including the first member group 203 including the plurality of flat first members 202 that are arranged in the horizontal direction of the separation tank 20 and the second member group 205 which vertically intersects the first member group 203 and includes a plurality of flat second members 204 that are arranged in the horizontal direction of the separation tank 20 is provided, and the electrode tube 50 is provided at a part in which the first member 202 and the second member 204 intersect, for example, in a step of separating metallic nanocarbons and semiconducting nanocarbons contained in the nanocarbon dispersion liquid 80 which is performed in a nanocarbon separation method to be described below, since a horizontal flow is blocked by the plurality of electrode tubes 50 and thus the occurrence of a horizontal flow in the nanocarbon dispersion liquid 80 can be inhibited, it is possible to separate metallic nanocarbons and semiconducting nanocarbons quickly and efficiently. The lengths of the plurality of flat first member groups 203 and second member groups 205 in the height direction are not particularly limited as long as the groups can block a horizontal flow, and they may be in contact with the bottom surface of the separation tank 20.

In addition, according to the nanocarbon separation device 200 of the present example embodiment, when the first electrode 30 (negative electrode) is provided at an upper part in the separation tank 20, and the second electrode 40 (positive electrode) is provided at a lower part in the separation tank 20, for example, in a step of separating metallic nanocarbons and semiconducting nanocarbons contained in the nanocarbon dispersion liquid 80 which is performed in a nanocarbon separation method to be described below, since the amount of metallic nanocarbons increases near the first electrode 30 and the amount of semiconducting nanocarbons increases near the second electrode 40, it is possible to stably separate metallic nanocarbons and semiconducting nanocarbons.

Here, when the first electrode 30 is a positive electrode and the second electrode 40 is a negative electrode, in a step of separating metallic nanocarbons and semiconducting nanocarbons contained in the nanocarbon dispersion liquid 80, since the amount of semiconducting nanocarbons increases near the first electrode 30 and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 200 will be described and also operations of the nanocarbon separation device 200 will be described with reference to FIG. 5.

As in the first example embodiment, the nanocarbon separation method of the present example embodiment includes a step of injecting the nanocarbon dispersion liquid 80 into the separation tank 20 (injection step) and a step of separating metallic nanocarbons and semiconducting nanocarbons contained in the nanocarbon dispersion liquid 80 by applying a direct current voltage to the first electrode 30 and the second electrode 40 (separation step).

In the injection step, when the nanocarbon dispersion liquid 80 is injected into the separation tank 20, the first electrode 30 and the second electrode 40 are brought into contact with the nanocarbon dispersion liquid 80. In the present example embodiment, the first electrode 30 and the second electrode 40 are immersed in the nanocarbon dispersion liquid 80.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles which are generated at the second electrode 40 and significantly impair the separation efficiency. As a result, it is possible to obtain highly pure metallic single-walled carbon nanotubes and semiconducting single-walled carbon nanotubes.

According to the nanocarbon separation method of the present example embodiment, when the holding member 201 including the first member group 203 including the plurality of flat first members 202 that are arranged in the horizontal direction of the separation tank 20 and the second member group 205 which vertically intersects the first member group 203 and includes a plurality of flat second members 204 that are arranged in the horizontal direction of the separation tank 20 is provided between a first electrode 12 and a second electrode 13, and the electrode tube 50 is provided at a part in which the first member 202 and the second member 204 intersect, since the occurrence of a horizontal flow in the single-walled carbon nanotube dispersion liquid can be inhibited, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 30 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 30 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Fourth Example Embodiment (Nanocarbon Separation Device)

Figure 6:
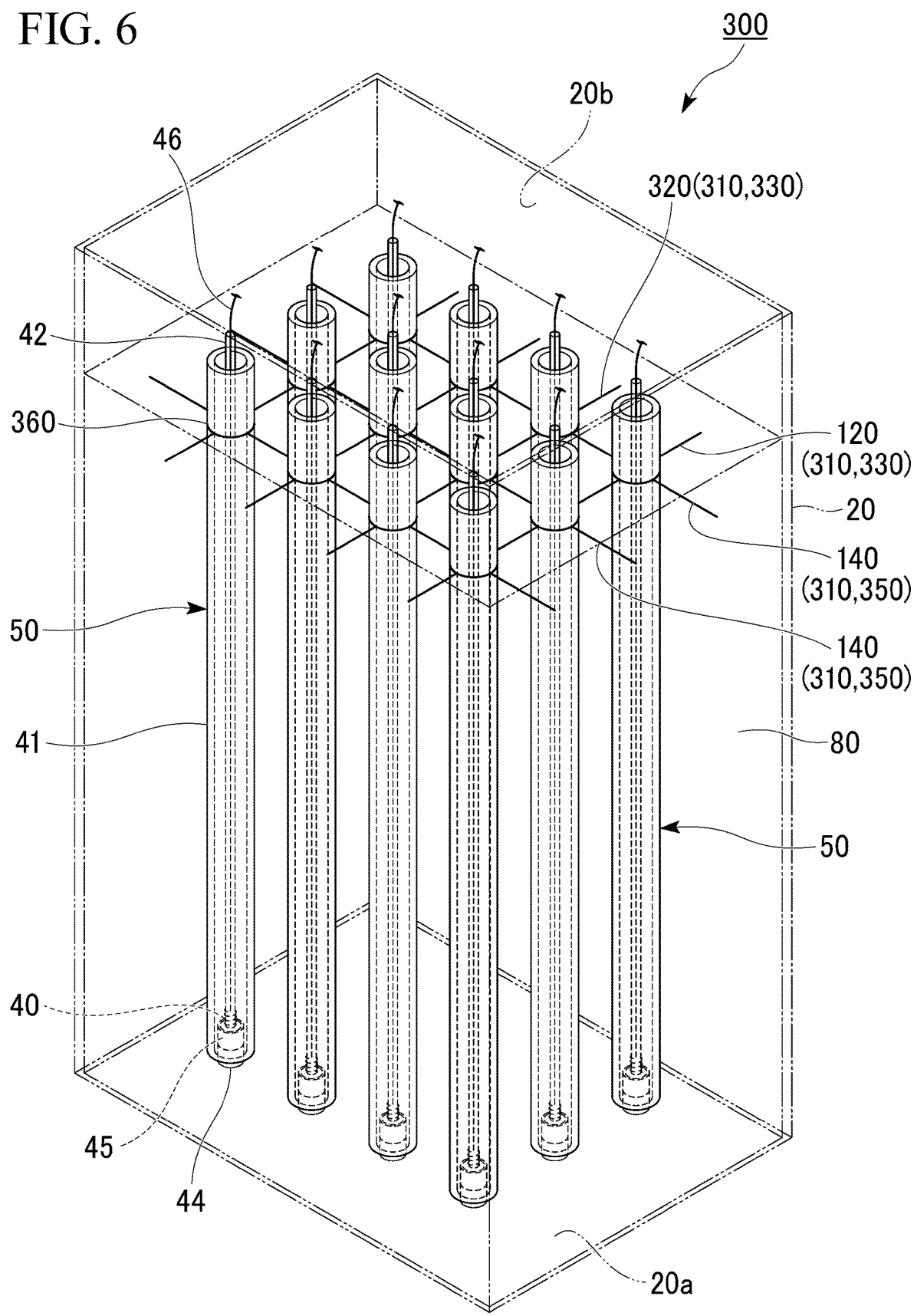
FIG. 6 is a perspective view showing a nanocarbon separation device of a fourth example embodiment.

FIG. 6 is a perspective view showing a nanocarbon separation device of the present example embodiment.

Here, in FIG. 6, components the same as those of the nanocarbon separation device of the first example embodiment shown in FIG. 1 will be denoted with the same reference numerals and redundant descriptions will be omitted.

A nanocarbon separation device 300 of the present example embodiment includes a separation tank (electrophoresis tank) 20 having a rectangular shape in a plan view, a first electrode 310 provided at an upper part in the separation tank 20, and a plurality of electrode tubes 50 that extend in the separation tank 20 in the height direction of the separation tank 20.

The first electrode 310 includes a first conductive wire 320 and a second conductive wire 340 that connect the electrode tubes 50. More specifically, the first electrode 310 includes a first conductive wire group 330 including a plurality of first conductive wires 320 that are arranged at equal intervals and a second conductive wire group 350 which vertically intersects the first conductive wire group 330 and includes a plurality of second conductive wires 340 that are arranged at equal intervals.

The first electrode 310 is disposed at an upper part in the height direction (in the separation tank 20, in a region higher than half of the height thereof, which is a region opposite to the inner bottom surface 20a of the separation tank 20) in the separation tank 20.

In the nanocarbon separation device 300 of the present example embodiment, the first electrode 310 is a negative electrode, and the second electrode 40 is a positive electrode.

The first electrode 310 is a linear electrode having a grid shape in a plan view. The grid in the first electrode 310 has a square shape or a rectangular shape in a plan view. In addition, the first electrode 310 is provided along the outer circumference of the tubular member 41 of the electrode tube 50. In other words, the first electrode 310 has a plurality of annular parts 360 composed of the first conductive wire 320 or the second conductive wire 340 at an intersection between the first conductive wire 320 and the second conductive wire 340 and the electrode tube 50 is inserted into the annular part 160. The plurality of annular parts 360 are preferably arranged at equal intervals in a plan view of the first electrode 310. When the plurality of annular parts 360 are arranged at equal intervals in a plan view of the first electrode 310, the electrode tubes 50 are arranged at equal intervals in a plan view of the first electrode 310.

The first conductive wire 320 and the second conductive wire 340 are not particularly limited as long as they can be used for carrier-free electrophoresis and are stable with respect to the nanocarbon dispersion liquid 80. Examples of the first conductive wire 320 and the second conductive wire 340 include a platinum electrode.

The nanocarbon separation device 300 of the present example embodiment may include an injection port (not shown) through which the nanocarbon dispersion liquid 80 is injected into the separation tank 20 as in the first example embodiment.

In addition, the nanocarbon separation device 300 of the present example embodiment may include a recovery port (not shown) through which the nanocarbon dispersion liquid 80 in the separation tank 20 is recovered as in the first example embodiment.

The nanocarbon separation device 300 of the present example embodiment preferably includes a temperature adjusting unit configured to keep the temperature of the nanocarbon dispersion liquid 80 in the separation tank 20 constant as in the first example embodiment.

While a case in which the first electrode 310 is a negative electrode and the second electrode 40 is a positive electrode has been provided as an exemplary of the nanocarbon separation device 300 of the present example embodiment, the nanocarbon separation device 300 of the present example embodiment is not limited thereto. In the nanocarbon separation device 300 of the present example embodiment, the first electrode 310 may be a positive electrode and the second electrode 40 may be a negative electrode.

According to the nanocarbon separation device 300 of the present example embodiment, since the first electrode 310 composed of the first conductive wire 320 and the second conductive wire 340 is provided at an intersection between the first conductive wire 320 and the second conductive wire 340 along the outer circumference of the tubular member 41 of the electrode tube 50, in the separation tank 20, the first electrode 310 also functions as a holding member of the electrode tube 50, and the structure in the separation tank 20 can be simplified. Thereby, in the separation tank 20, it is possible to secure a sufficient space in which the nanocarbon dispersion liquid 80 is accommodated.

In addition, according to the nanocarbon separation device 300 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, it is possible to prevent the occurrence of a convection phenomenon of the nanocarbon dispersion liquid 80 due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons contained in the nanocarbon dispersion liquid 80 outside the electrode tube 50 in the separation tank 20 quickly and efficiently.

In addition, according to the nanocarbon separation device 300 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, since a horizontal flow is blocked by the plurality of electrode tubes 50, and thus the occurrence of a horizontal flow in the nanocarbon dispersion liquid 80 can be inhibited, it is possible to separate metallic nanocarbons and semiconducting nanocarbons quickly and efficiently.

In addition, according to the nanocarbon separation device 300 of the present example embodiment, when the first electrode 310 (negative electrode) is provided at an upper part in the separation tank 20 and the second electrode 40 (positive electrode) is provided at a lower part in the separation tank 20, for example, in a step of separating metallic nanocarbons and semiconducting nanocarbons contained in the nanocarbon dispersion liquid 80 which is performed in a nanocarbon separation method to be described below, since the amount of metallic nanocarbons increases near the first electrode 310 and the amount of semiconducting nanocarbons increases near the second electrode 40, it is possible to stably separate metallic nanocarbons and semiconducting nanocarbons.

Here, when the first electrode 310 is a positive electrode and the second electrode 40 is a negative electrode, in a step of separating metallic nanocarbons and semiconducting nanocarbons contained in the nanocarbon dispersion liquid 80, since the amount of semiconducting nanocarbons increases near the first electrode 310 and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 300 will be described and also operations of the nanocarbon separation device 300 will be described with reference to FIG. 6.

As in the first example embodiment, the nanocarbon separation method of the present example embodiment includes a step of injecting the nanocarbon dispersion liquid 80 into the separation tank 20 (injection step) and a step of separating metallic nanocarbons and semiconducting nanocarbons contained in the nanocarbon dispersion liquid 80 by applying a direct current voltage to the first electrode 310 and the second electrode 40 (separation step).

In the injection step, when the nanocarbon dispersion liquid 80 is injected into the separation tank 20, the first electrode 310 and the second electrode 40 are brought into contact with the nanocarbon dispersion liquid 80. In the present example embodiment, the first electrode 310 and the second electrode 40 are immersed in the nanocarbon dispersion liquid 80.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles generated at the second electrode 40. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid can be inhibited by the plurality of electrode tubes 50, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 310 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 310 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Fifth Example Embodiment (Nanocarbon Separation Device)

Figure 7:
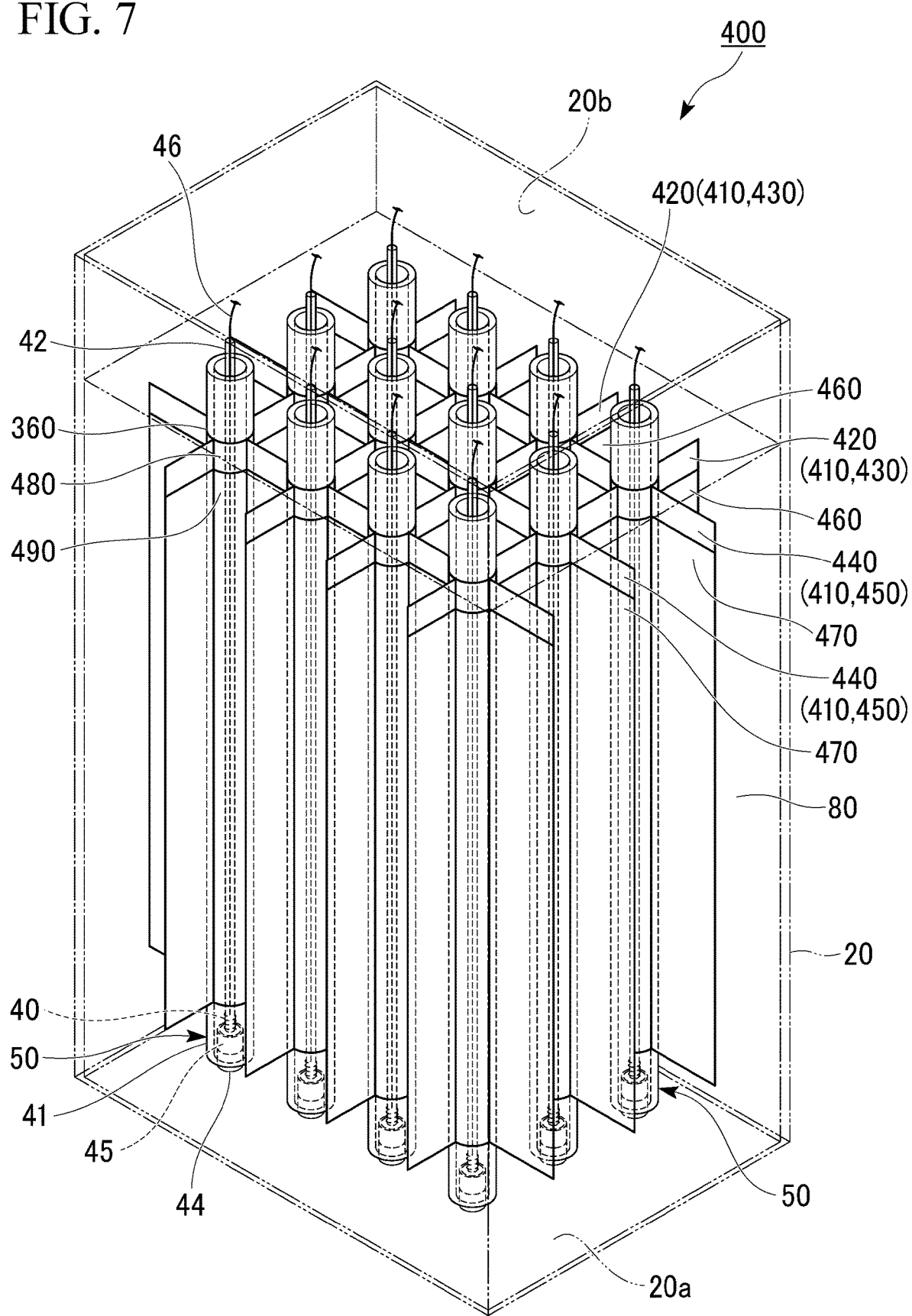
FIG. 7 is a perspective view showing a nanocarbon separation device of a fifth example embodiment.

FIG. 7 is a perspective view showing a nanocarbon separation device of the present example embodiment.

Here, in FIG. 7, components the same as those of the nanocarbon separation device of the first example embodiment shown in FIG. 1 will be denoted with the same reference numerals and redundant descriptions will be omitted.

A nanocarbon separation device 400 of the present example embodiment includes a separation tank (electrophoresis tank) 20 having a rectangular shape in a plan view, a first electrode 410 provided at an upper part in the separation tank 20, and a plurality of electrode tubes 50 that extend in the separation tank 20 in the height direction of the separation tank 20.

The first electrode 410 includes a first metal plate 420 and a second metal plate 440 that connect the electrode tubes 50. More specifically, the first electrode 410 includes a first metal plate group 430 including a plurality of first metal plates 420 that are arranged at equal intervals and a second metal plate group 450 which vertically intersects the first metal plate group 430 and includes a plurality of second metal plates 440 that are arranged at equal intervals.

In addition, an insulating plate 460 is provided below (the side of the inner bottom surface 20a of the separation tank 20) the first metal plate 420. An insulating plate 470 is continuously provided below (the side of the inner bottom surface 20a of the separation tank 20) the second metal plate 440. The insulating plate 460 and the insulating plate 470 also intersect vertically.

The first electrode 410 is disposed at an upper part in the height direction (in the separation tank 20, in a region higher than half of the height thereof, which is a region opposite to the inner bottom surface 20a of the separation tank 20) in the separation tank 20.

The installation position and the length in the height direction of the insulating plate 460 and the insulating plate 470 are not particularly limited as long as a horizontal flow can be blocked in the separation tank 20, and the plates may be in contact with the bottom surface of the separation tank 20.

In the nanocarbon separation device 400 of the present example embodiment, for example, the first electrode 410 is a negative electrode, and the second electrode 40 is a positive electrode.

The first electrode 410 is a plate electrode having a grid shape in a plan view. The grid in the first electrode 410 has a square shape or a rectangular shape in a plan view. In addition, the first electrode 410 is provided along the outer circumference of the tubular member 41 of the electrode tube 50. In other words, the first electrode 410 has a plurality of annular parts 480 composed of the first metal plate 420 or the second metal plate 440 and a plurality of annular parts 490 composed of the insulating plate 460 or the insulating plate 470 at an intersection between the first metal plate 420 and the second metal plate 440. The annular part 480 and the annular part 490 communicate with each other, and the electrode tube 50 is inserted into the annular part 480 and the annular part 490. The plurality of annular parts 480 and annular parts 490 are preferably arranged at equal intervals in a plan view of the first electrode 410. When the plurality of annular parts 480 and annular parts 490 are arranged at equal intervals in a plan view of the first electrode 410, the electrode tubes 50 are arranged at equal intervals in a plan view of the first electrode 410.

The first metal plate 420 and the second metal plate 440 are not particularly limited as long as they can be used for carrier-free electrophoresis and are stable with respect to the nanocarbon dispersion liquid 80. Examples of the first metal plate 420 and the second metal plate 440 include a platinum electrode.

The material of the insulating plate 460 and the insulating plate 470 is not particularly limited as long as it is stable with respect to the nanocarbon dispersion liquid 80 and is an insulating material. Examples of materials of the insulating plate 460 and the insulating plate 470 include glass, quartz, and acrylic resin.

The nanocarbon separation device 400 of the present example embodiment may include an injection port (not shown) through which the nanocarbon dispersion liquid 80 is injected into the separation tank 20 as in the first example embodiment.

In addition, the nanocarbon separation device 400 of the present example embodiment may include a recovery port (not shown) through which the nanocarbon dispersion liquid 80 in the separation tank 20 is recovered as in the first example embodiment.

The nanocarbon separation device 400 of the present example embodiment preferably includes a temperature adjusting unit configured to keep the temperature of the nanocarbon dispersion liquid 80 in the separation tank 20 constant as in the first example embodiment.

While a case in which the first electrode 410 is a negative electrode and the second electrode 40 is a positive electrode has been provided as an exemplary of the nanocarbon separation device 400 of the present example embodiment, the nanocarbon separation device 400 of the present example embodiment is not limited thereto. In the nanocarbon separation device 400 of the present example embodiment, the first electrode 410 may be a positive electrode and the second electrode 40 may be a negative electrode.

According to the nanocarbon separation device 400 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, it is possible to prevent the occurrence of a convection phenomenon of the nanocarbon dispersion liquid 80 due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons contained in the nanocarbon dispersion liquid 80 outside the electrode tube 50 in the separation tank 20 quickly and efficiently.

According to the nanocarbon separation device 400 of the present example embodiment, when the plurality of electrode tubes 50, the first metal plate 420 constituting the first electrode 410, the second metal plate 440, the insulating plate 460 and an insulating plate 270 are provided in the separation tank 20, for example, in a step of separating metallic nanocarbons and semiconducting nanocarbons contained in the nanocarbon dispersion liquid 80 which is performed in a nanocarbon separation method to be described below, since a horizontal flow is blocked by the plurality of electrode tubes 50, the first metal plate 420 constituting the first electrode 410, the second metal plate 440, the insulating plate 460, and the insulating plate 270, and thus the occurrence of a horizontal flow in the nanocarbon dispersion liquid 80 can be inhibited, it is possible to separate metallic nanocarbons and semiconducting nanocarbons quickly and efficiently.

In addition, according to the nanocarbon separation device 400 of the present example embodiment, when the first electrode 410 (negative electrode) is provided at an upper part in the separation tank 20 and the second electrode 40 (positive electrode) is provided at a lower part in the separation tank 20, for example, in a step of separating metallic nanocarbons and semiconducting nanocarbons contained in the nanocarbon dispersion liquid 80 which is performed in a nanocarbon separation method to be described below, since the amount of metallic nanocarbons increases near the first electrode 410 and the amount of semiconducting nanocarbons increases near the second electrode 40, it is possible to stably separate metallic nanocarbons and semiconducting nanocarbons.

Here, when the first electrode 410 is a positive electrode and the second electrode 40 is a negative electrode, in a step of separating metallic nanocarbons and semiconducting nanocarbons contained in the nanocarbon dispersion liquid 80, since the amount of semiconducting nanocarbons increases near the first electrode 410 and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 400 will be described and also operations of the nanocarbon separation device 400 will be described with reference to FIG. 7.

As in the first example embodiment, the nanocarbon separation method of the present example embodiment includes a step of injecting the nanocarbon dispersion liquid 80 into the separation tank 20 (injection step) and a step of separating metallic nanocarbons and semiconducting nanocarbons contained in the nanocarbon dispersion liquid 80 by applying a direct current voltage to the first electrode 410 and the second electrode 40 (separation step).

In the injection step, when the nanocarbon dispersion liquid 80 is injected into the separation tank 20, the first electrode 410 and the second electrode 40 are brought into contact with the nanocarbon dispersion liquid 80. In the present example embodiment, the first electrode 410 and the second electrode 40 are immersed in the nanocarbon dispersion liquid 80.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles which are generated at the second electrode 40 and significantly impair the separation efficiency. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid can be inhibited by the plurality of electrode tubes 50, the first metal plate 420 constituting the first electrode 410, the second metal plate 440, the insulating plate 460, and the insulating plate 470, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 410 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 410 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Sixth Example Embodiment (Nanocarbon Separation Device)

Figure 8:
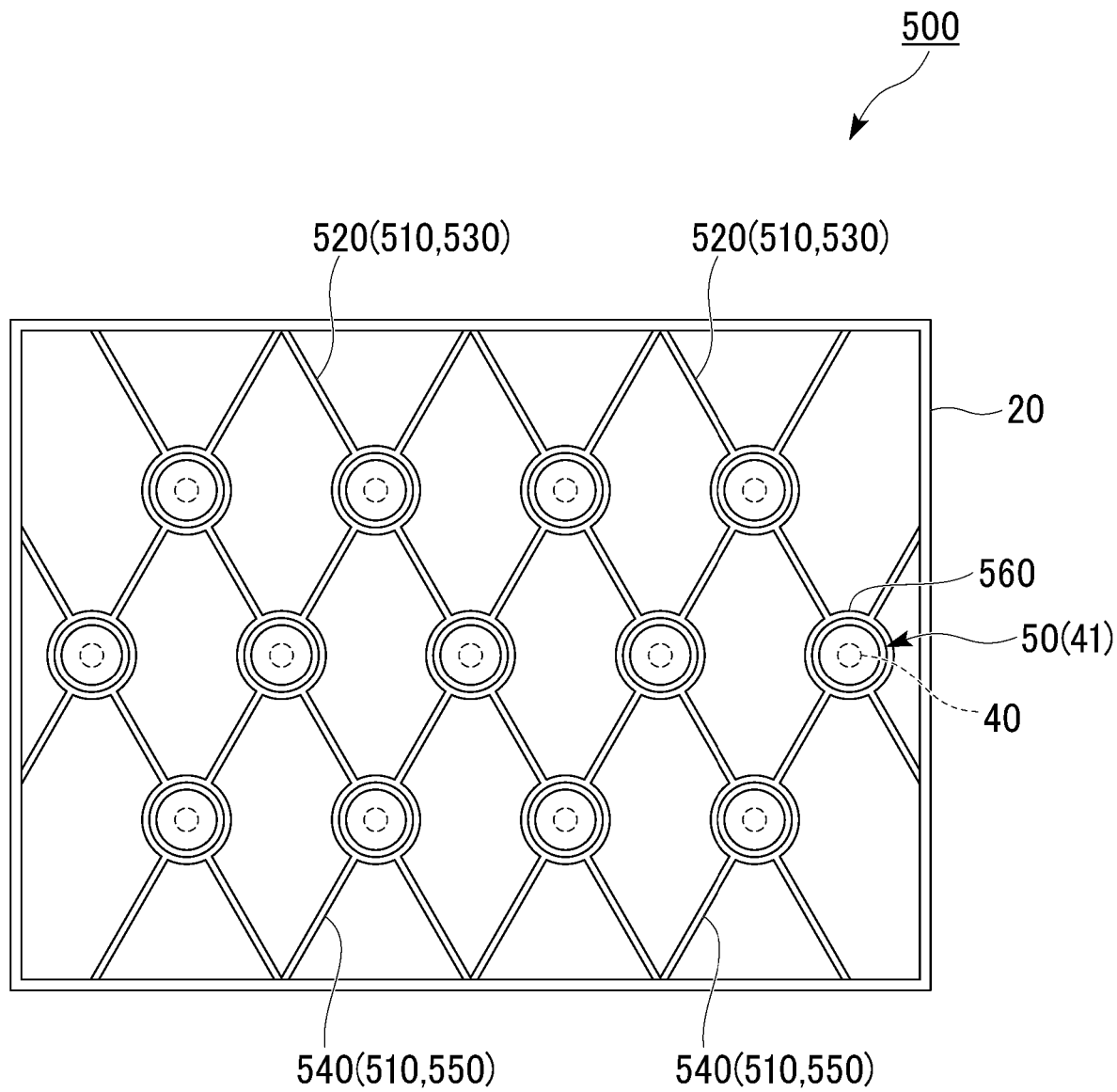
FIG. 8 is a plan view showing a nanocarbon separation device of a sixth example embodiment.

FIG. 8 is a plan view showing a nanocarbon separation device of the present example embodiment.

Here, in FIG. 8, components the same as those of the nanocarbon separation device of the first example embodiment shown in FIG. 1 will be denoted with the same reference numerals and redundant descriptions will be omitted.

A nanocarbon separation device 500 of the present example embodiment includes a separation tank (electrophoresis tank) 20 having a rectangular shape in a plan view, a first electrode 510 provided at an upper part in the separation tank 20, and a plurality of electrode tubes 50 that extend in the separation tank 20 in the height direction of the separation tank 20.

The first electrode 510 includes a first conductor 520 and a second conductor 540 that connect the electrode tubes 50. More specifically, the first electrode 510 includes a first conductor group 530 including a plurality of first conductors 520 that are arranged at equal intervals and a second conductor group 550 which obliquely intersects the first conductor group 530 and includes a plurality of second conductors 540 that are arranged at equal intervals.

Regarding the first conductor 520, those having the same structure as that of the first conductive wire 320 in the fourth example embodiment or those having the same structure as that of the first metal plate 420 in the fifth example embodiment are used.

Regarding the second conductor 540, those having the same structure as that of the second conductive wire 340 in the fourth example embodiment or those having the same structure as that of the second metal plate 440 in the fifth example embodiment are used.

The first electrode 510 is disposed at an upper part in the height direction (in the separation tank 20, in a region higher than half of the height thereof, which is a region opposite to the inner bottom surface 20a of the separation tank 20) in the separation tank 20.

In the nanocarbon separation device 500 of the present example embodiment, the first electrode 510 is a negative electrode, and the second electrode 40 is a positive electrode.

The first electrode 510 is a wire or plate electrode having a grid shape in a plan view. The grid in the first electrode 510 has a diamond shape in a plan view. In addition, the first electrode 510 is provided along the outer circumference of the tubular member 41 of the electrode tube 50. In other words, the first electrode 510 has a plurality of annular parts 560 composed of the first conductor 520 or the second conductor 540 at an intersection between the first conductor 520 and the second conductor 540, and the electrode tube 50 is inserted into the annular part 560. The plurality of annular parts 560 are preferably arranged at equal intervals in a plan view of the first electrode 510. When the plurality of annular parts 560 are arranged at equal intervals in a plan view of the first electrode 510, the electrode tubes 50 are arranged at equal intervals in a plan view of the first electrode 510.

As in the first example embodiment, the nanocarbon separation device 500 of the present example embodiment may include an injection port (not shown) through which the nanocarbon dispersion liquid is injected into the separation tank 20.

In addition, as in the first example embodiment, the nanocarbon separation device 500 of the present example embodiment may include a recovery port (not shown) through which the nanocarbon dispersion liquid in the separation tank 20 is recovered.

As in the first example embodiment, the nanocarbon separation device 500 of the present example embodiment preferably includes a temperature adjusting unit for keeping the temperature of the single-walled carbon nanotube dispersion liquid in the separation tank 20 constant.

While a case in which the first electrode 510 is a negative electrode and the second electrode 40 is a positive electrode has been provided as an exemplary of the nanocarbon separation device 500 of the present example embodiment, the nanocarbon separation device 500 of the present example embodiment is not limited thereto. In the nanocarbon separation device 500 of the present example embodiment, the first electrode 510 may be a positive electrode and the second electrode 40 may be a negative electrode.

According to the nanocarbon separation device 500 of the present example embodiment, since the first electrode 510 includes the first conductor 520 and the second conductor 540 that connect the electrode tubes 50, in the separation tank 20, the first electrode 510 also functions as a holding member of the electrode tube 50, and the structure in the separation tank 20 can be simplified. Thereby, in the separation tank 20, it is possible to secure a sufficient space in which the nanocarbon dispersion liquid is accommodated.

According to the nanocarbon separation device 500 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid which is performed in a nanocarbon separation method to be described below, it is possible to prevent the occurrence of a convection phenomenon of the nanocarbon dispersion liquid due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons contained in the nanocarbon dispersion liquid outside the electrode tube 50 in the separation tank 20 quickly and efficiently.

In addition, according to the nanocarbon separation device 500 of the present example embodiment, in the separation tank 20, according to the plurality of electrode tubes 50, the first conductor 520, and the second conductor 540, for example, in a step of separating metallic nanocarbons and semiconducting nanocarbons contained in the nanocarbon dispersion liquid which is performed in a nanocarbon separation method to be described below, since a horizontal flow is blocked by the plurality of electrode tubes 50, the first conductor 520, and the second conductor 540, and thus the occurrence of a horizontal flow in the nanocarbon dispersion liquid can be inhibited, it is possible to separate metallic nanocarbons and semiconducting nanocarbons quickly and efficiently.

In addition, according to the nanocarbon separation device 500 of the present example embodiment, when the first electrode 30 (negative electrode) is provided at an upper part in the separation tank 20, and the second electrode 40 (positive electrode) is provided at a lower part in the separation tank 20, for example, in a step of separating metallic nanocarbons and semiconducting nanocarbons contained in the nanocarbon dispersion liquid which is performed in a nanocarbon separation method to be described below, since the amount of metallic nanocarbons increases near the first electrode 510 and the amount of semiconducting nanocarbons increases near the second electrode 40, it is possible to stably separate metallic nanocarbons and semiconducting nanocarbons.

Here, when the first electrode 510 is a positive electrode, and the second electrode 40 is a negative electrode, in a step of separating metallic nanocarbons and semiconducting nanocarbons contained in the nanocarbon dispersion liquid, since the amount of semiconducting nanocarbons increases near the first electrode 510 and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 500 will be described and also operations of the nanocarbon separation device 500 will be described with reference to FIG. 8.

As in the first example embodiment, the nanocarbon separation method of the present example embodiment includes a step of injecting the single-walled carbon nanotube dispersion liquid into the separation tank 20 (injection step) and a step of separating metallic single-walled carbon nanotubes and semiconducting single-walled carbon nanotubes contained in the single-walled carbon nanotube dispersion liquid by applying a direct current voltage to the first electrode 510 and the second electrode 40 (separation step).

In the injection step, when the single-walled carbon nanotube dispersion liquid is injected into the separation tank 20, the first electrode 510 and the second electrode 40 are brought into contact with the single-walled carbon nanotube dispersion liquid. In the present example embodiment, the first electrode 510 and the second electrode 40 are immersed in the single-walled carbon nanotube dispersion liquid.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles generated at the second electrode 40. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid can be inhibited by the plurality of electrode tubes 50, the first conductor 520, and the second conductor 540, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 510 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 510 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Seventh Example Embodiment (Nanocarbon Separation Device)

Figure 9:
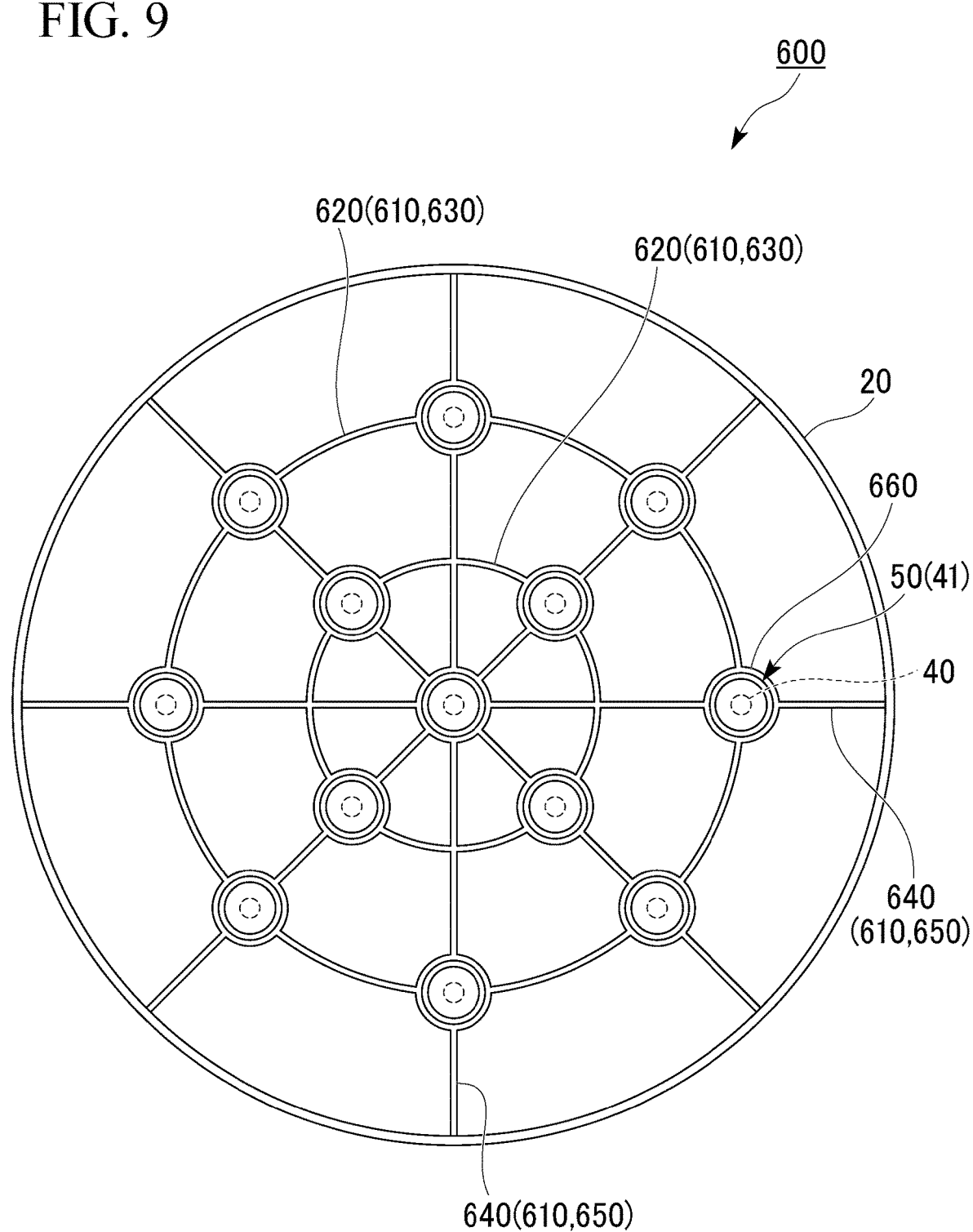
FIG. 9 is a plan view showing a nanocarbon separation device of a seventh example embodiment.

FIG. 9 is a plan view showing a nanocarbon separation device of the present example embodiment.

Here, in FIG. 9, components the same as those of the nanocarbon separation device of the first example embodiment shown in FIG. 1 will be denoted with the same reference numerals and redundant descriptions will be omitted.

A nanocarbon separation device 600 of the present example embodiment includes a separation tank (electrophoresis tank) 20 having a circular shape in a plan view, a first electrode 610 provided at an upper part in the separation tank 20, and a plurality of electrode tubes 50 that extend in the separation tank 20 in the height direction of the separation tank 20.

The first electrode 610 includes a first conductor 620 and a second conductor 640 that connect the electrode tubes 50. More specifically, the first electrode 610 includes a first conductor group 630 including a plurality of first conductors 620 which have a circular shape in a plan view and are concentrically arranged and a second conductor group 650 which crosses the first conductor group 630 perpendicularly and includes a plurality of second conductors 640 which have a linear shape in a plan view and are arranged at equal intervals.

In the nanocarbon separation device 600 of the present example embodiment, a circle composed of the first conductor 620 is partitioned into eight regions at equal intervals by the four second conductors 640.

Regarding the first conductor 620, those having the same structure as that of a fourth conductive wire 320 in the second example embodiment or those having the same structure as that of the first metal plate 420 in the fifth example embodiment are used.

Regarding the second conductor 640, those having the same structure as that of the second conductive wire 340 in the fourth example embodiment or those having the same structure as that of the second metal plate 440 in the fifth example embodiment are used.

The first electrode 610 is disposed at an upper part in the height direction (in the separation tank 20, in a region higher than half of the height thereof, which is a region opposite to the inner bottom surface 20a of the separation tank 20) in the separation tank 20.

In the nanocarbon separation device 600 of the present example embodiment, the first electrode 610 is a negative electrode, and the second electrode 40 is a positive electrode.

The first electrode 610 is a wire or plate electrode having a grid shape in a plan view. The grid in the first electrode 610 has a fan shape in a plan view. In addition, the first electrode 610 is provided along the outer circumference of the tubular member 41 of the electrode tube 50. In other words, the first electrode 610 has a plurality of annular parts 660 composed of the first conductor 620 or the second conductor 640 at an intersection between the first conductor 620 and the second conductor 640, and the electrode tube 50 is inserted into the annular part 660. The plurality of annular parts 660 are preferably arranged at equal intervals in a plan view of the first electrode 510. When the plurality of annular parts 660 are arranged at equal intervals in a plan view of the first electrode 510, the electrode tubes 50 are arranged at equal intervals in a plan view of the first electrode 510.

As in the first example embodiment, the nanocarbon separation device 600 of the present example embodiment may include an injection port (not shown) through which the nanocarbon dispersion liquid is injected into the separation tank 20.

In addition, as in the first example embodiment, the nanocarbon separation device 600 of the present example embodiment may include a recovery port (not shown) through which the nanocarbon dispersion liquid in the separation tank 20 is recovered.

As in the first example embodiment, the nanocarbon separation device 600 of the present example embodiment preferably includes a temperature adjusting unit for keeping the temperature of the nanocarbon dispersion liquid in the separation tank 20 constant.

While a case in which the first electrode 610 is a negative electrode and the second electrode 40 is a positive electrode has been provided as an exemplary of the nanocarbon separation device 600 of the present example embodiment, the nanocarbon separation device 600 of the present example embodiment is not limited thereto. In the nanocarbon separation device 600 of the present example embodiment, the first electrode 610 may be a positive electrode and the second electrode 40 may be a negative electrode.

According to the nanocarbon separation device 600 of the present example embodiment, since the first electrode 610 has a grid shape in a plan view and is provided along the outer circumference of the electrode tube 50, the first electrode 610 also functions as a holding member of the electrode tube 50 in the separation tank 20, and the structure in the separation tank 20 can be simplified. Thereby, in the separation tank 20, it is possible to secure a sufficient space in which the nanocarbon dispersion liquid is accommodated.

According to the nanocarbon separation device 600 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid which is performed in a nanocarbon separation method to be described below, it is possible to prevent the occurrence of a convection phenomenon of the nanocarbon dispersion liquid due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons contained in the nanocarbon dispersion liquid outside the electrode tube 50 in the separation tank 20 quickly and efficiently.

In addition, according to the nanocarbon separation device 600 of the present example embodiment, in the separation tank 20, according to the plurality of electrode tubes 50, the first conductor 620 and the second conductor 640, for example, in a step of separating metallic nanocarbons and semiconducting nanocarbons contained in the nanocarbon dispersion liquid which is performed in a nanocarbon separation method to be described below, since a horizontal flow is blocked by the plurality of electrode tubes 50, the first conductor 620 and the second conductor 640, and thus the occurrence of a horizontal flow in the nanocarbon dispersion liquid can be inhibited, it is possible to separate metallic nanocarbons and semiconducting nanocarbons quickly and efficiently.

In addition, according to the nanocarbon separation device 600 of the present example embodiment, when the first electrode 610 (negative electrode) is provided at an upper part in the separation tank 20 and the second electrode 40 (positive electrode) is provided at a lower part in the separation tank 20, for example, in a step of separating metallic nanocarbons and semiconducting nanocarbons contained in the nanocarbon dispersion liquid which is performed in a nanocarbon separation method to be described below, since the amount of metallic nanocarbons increases near the first electrode 610 and the amount of semiconducting nanocarbons increases near the second electrode 40, it is possible to stably separate metallic nanocarbons and semiconducting nanocarbons.

Here, when the first electrode 610 is a positive electrode, and the second electrode 40 is a negative electrode, in a step of separating metallic nanocarbons and semiconducting nanocarbons contained in the nanocarbon dispersion liquid, since the amount of semiconducting nanocarbons increases near the first electrode 610, and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 600 will be described and also operations of the nanocarbon separation device 600 will be described with reference to FIG. 9.

As in the first example embodiment, the nanocarbon separation method of the present example embodiment includes a step of injecting the single-walled carbon nanotube dispersion liquid into the separation tank 20 (injection step) and a step of separating metallic single-walled carbon nanotubes and semiconducting single-walled carbon nanotubes contained in the single-walled carbon nanotube dispersion liquid by applying a direct current voltage to the first electrode 610 and the second electrode 40 (separation step).

In the injection step, when the single-walled carbon nanotube dispersion liquid is injected into the separation tank 20, the first electrode 610 and the second electrode 40 are brought into contact with the single-walled carbon nanotube dispersion liquid. In the present example embodiment, the first electrode 610 and the second electrode 40 are immersed in the single-walled carbon nanotube dispersion liquid.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles which are generated at the second electrode 40 and significantly impair the separation efficiency. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid can be inhibited by the plurality of electrode tubes 50, the first conductor 620 and the second conductor 640, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 610, and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 610 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Eighth Example Embodiment (Nanocarbon Separation Device)

Figure 10:
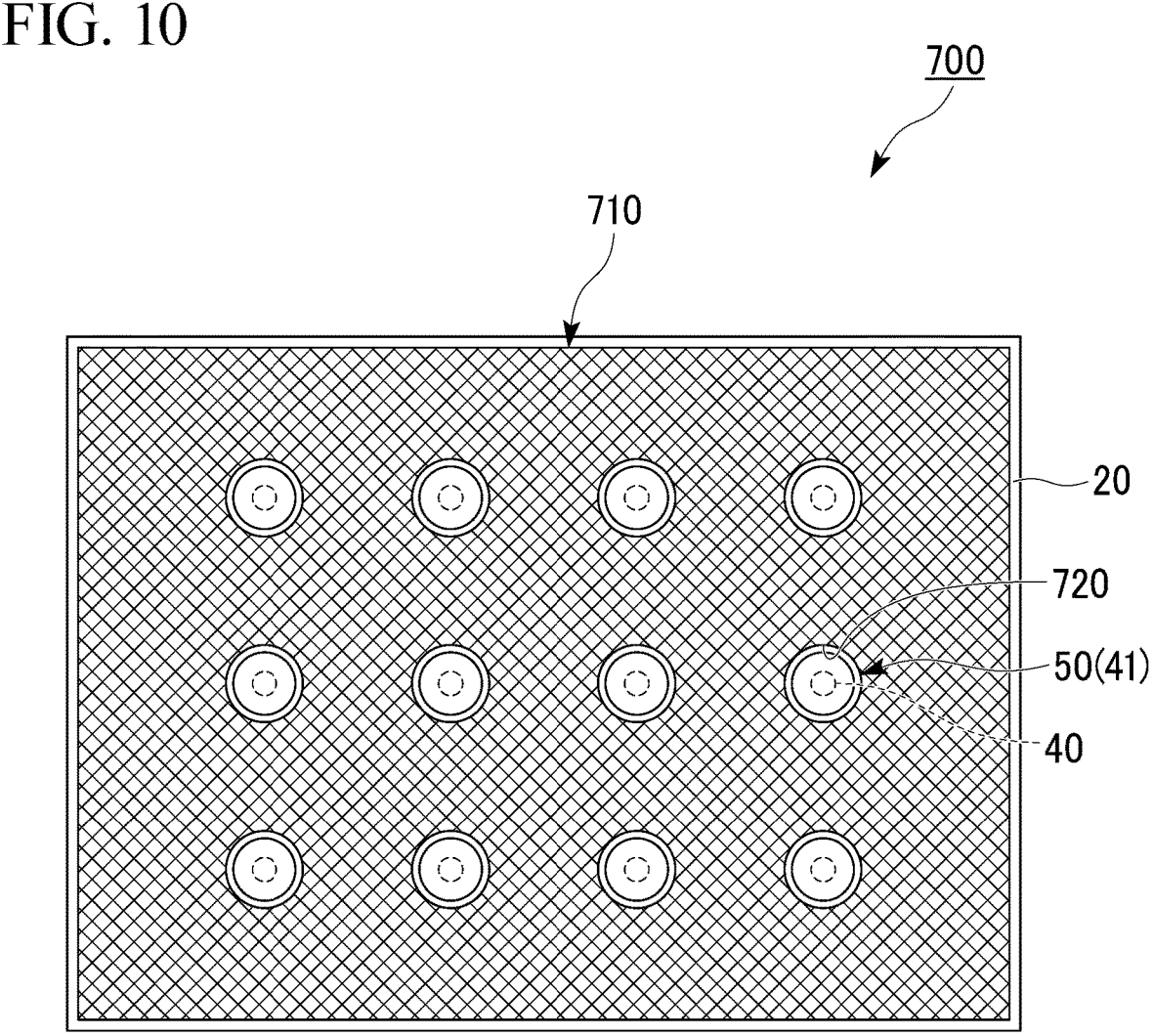
FIG. 10 is a plan view showing a nanocarbon separation device of an eighth example embodiment.

FIG. 10 is a plan view showing a nanocarbon separation device of the present example embodiment.

Here, in FIG. 10, components the same as those of the nanocarbon separation device of the first example embodiment shown in FIG. 1 will be denoted with the same reference numerals and redundant descriptions will be omitted.

A nanocarbon separation device 700 of the present example embodiment includes a separation tank (electrophoresis tank) 20 having a rectangular shape in a plan view, a first electrode 710 provided at an upper part in the separation tank 20, and a plurality of electrode tubes 50 that extend in the separation tank 20 in the height direction of the separation tank 20.

The first electrode 710 is disposed between the plurality of electrode tubes 50 and holds the electrode tube 50. In the nanocarbon separation device 700 of the present example embodiment, the first electrode 710 is a mesh-like electrode having a rectangular shape in a plan view. In addition, the first electrode 710 has a plurality of through-holes 720 that penetrate therethrough in the thickness direction. The plurality of through-holes 720 are preferably arranged at equal intervals in a plan view of the first electrode 710. The electrode tube 50 is inserted into the through-hole 720 of the first electrode 710. Thereby, the electrode tube 50 having the second electrode 40 is disposed in the separation tank 20. In addition, when the plurality of through-holes 720 are arranged at equal intervals in a plan view of the first electrode 710, the electrode tubes 50 are arranged at equal intervals in a plan view of the first electrode 710.

The first electrode 710 is disposed at an upper part in the height direction (in the separation tank 20, in a region higher than half of the height thereof, which is a region opposite to the inner bottom surface 20a of the separation tank 20) in the separation tank 20.

In the nanocarbon separation device 700 of the present example embodiment, the first electrode 710 is a negative electrode, and the second electrode 40 is a positive electrode.

The first electrode 710 is not particularly limited as long as it can be used for carrier-free electrophoresis and is stable with respect to a nanocarbon dispersion liquid. Examples of the first electrode 710 include a platinum electrode.

As in the first example embodiment, the nanocarbon separation device 700 of the present example embodiment may include an injection port (not shown) through which the nanocarbon dispersion liquid is injected into the separation tank 20.

In addition, as in the first example embodiment, the nanocarbon separation device 700 of the present example embodiment may include a recovery port (not shown) through which the nanocarbon dispersion liquid in the separation tank 20 is recovered.

As in the first example embodiment, the nanocarbon separation device 700 of the present example embodiment preferably includes a temperature adjusting unit for keeping the temperature of the nanocarbon dispersion liquid in the separation tank 20 constant.

While a case in which the first electrode 710 is a negative electrode and the second electrode 40 is a positive electrode has been provided as an exemplary of the nanocarbon separation device 700 of the present example embodiment, the nanocarbon separation device 700 of the present example embodiment is not limited thereto. In the nanocarbon separation device 700 of the present example embodiment, the first electrode 710 may be a positive electrode and the second electrode 40 may be a negative electrode.

According to the nanocarbon separation device 700 of the present example embodiment, since the first electrode 710 is a mesh-like electrode and is provided along the outer circumference of the electrode tube 50, the first electrode 710 also functions as a holding member of the electrode tube 50 in the separation tank 20, and the structure in the separation tank 20 can be simplified. Thereby, in the separation tank 20, it is possible to secure a sufficient space in which the nanocarbon dispersion liquid is accommodated.

In addition, according to the nanocarbon separation device 700 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid which is performed in a nanocarbon separation method to be described below, it is possible to prevent the occurrence of a convection phenomenon of the nanocarbon dispersion liquid due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons contained in the nanocarbon dispersion liquid outside the electrode tube 50 in the separation tank 20 quickly and efficiently.

In addition, according to the nanocarbon separation device 700 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid which is performed in a nanocarbon separation method to be described below, since a horizontal flow is blocked by the plurality of electrode tubes 50 and thus the occurrence of a horizontal flow in the nanocarbon dispersion liquid can be inhibited, it is possible to separate metallic nanocarbons and semiconducting nanocarbons quickly and efficiently.

In addition, according to the nanocarbon separation device 700 of the present example embodiment, when the first electrode 710 (negative electrode) is provided at an upper part in the separation tank 20 and the second electrode 40 (positive electrode) is provided at a lower part in the separation tank 20, for example, in a step of separating metallic nanocarbons and semiconducting nanocarbons contained in the nanocarbon dispersion liquid which is performed in a nanocarbon separation method to be described below, since the amount of metallic nanocarbons increases near the first electrode 710 and the amount of semiconducting nanocarbons increases near the second electrode 40, it is possible to stably separate metallic nanocarbons and semiconducting nanocarbons.

Here, when the first electrode 710 is a positive electrode and the second electrode 40 is a negative electrode, in a step of separating metallic nanocarbons and semiconducting nanocarbons contained in the nanocarbon dispersion liquid, since the amount of semiconducting nanocarbons increases near the first electrode 710 and the amount of metallic nanocarbons increases near the second electrode 40, it is possible to stably separate metallic nanocarbons and semiconducting nanocarbons.

(Nanocarbon Separation Method)

A nanocarbon separation method using the nanocarbon separation device 700 will be described and also operations of the nanocarbon separation device 700 will be described with reference to FIG. 10.

As in the first example embodiment, the nanocarbon separation method of the present example embodiment includes a step of injecting the single-walled carbon nanotube dispersion liquid into the separation tank 20 (injection step) and a step of separating metallic single-walled carbon nanotubes and semiconducting single-walled carbon nanotubes contained in the single-walled carbon nanotube dispersion liquid by applying a direct current voltage to the first electrode 710 and the second electrode 40 (separation step).

In the injection step, when the single-walled carbon nanotube dispersion liquid is injected into the separation tank 20, the first electrode 710 and the second electrode 40 are brought into contact with the single-walled carbon nanotube dispersion liquid. In the present example embodiment, the first electrode 710 and the second electrode 40 are immersed in the single-walled carbon nanotube dispersion liquid.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles which are generated at the second electrode 40 and significantly impair the separation efficiency. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid can be inhibited by the plurality of electrode tubes 50, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 710 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 710 is a positive electrode and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid during separation due to hydrogen bubbles generated at the second electrode 40.

Ninth Example Embodiment (Nanocarbon Separation Device and Electrode Tube)

Figure 11:
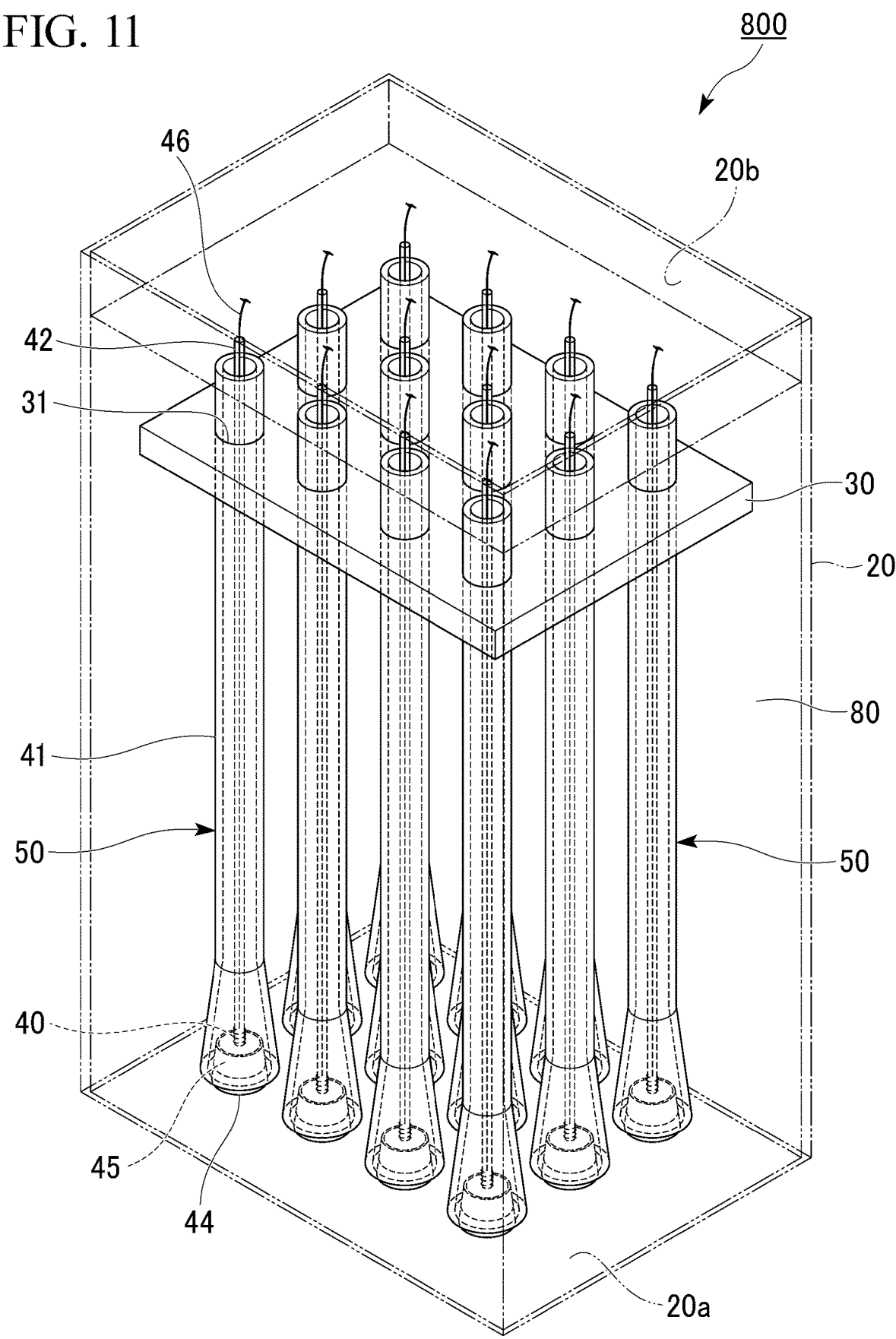
FIG. 11 is a perspective view showing a nanocarbon separation device of a ninth example embodiment.
Figure 12A:
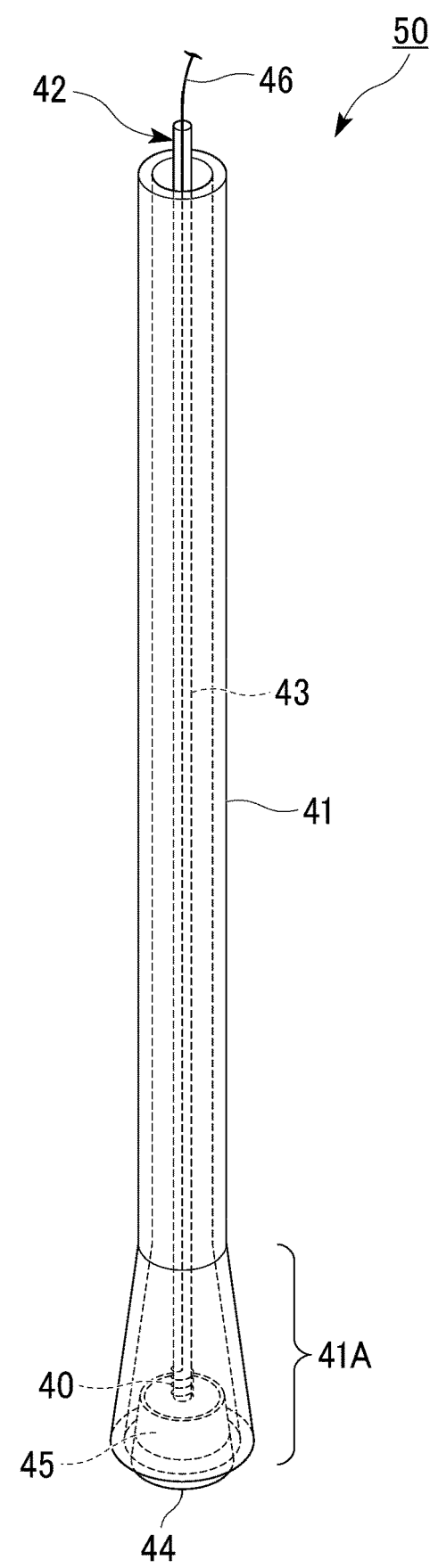
FIG. 12A is a perspective view showing an electrode tube in the nanocarbon separation device of the ninth example embodiment.
Figure 12B:
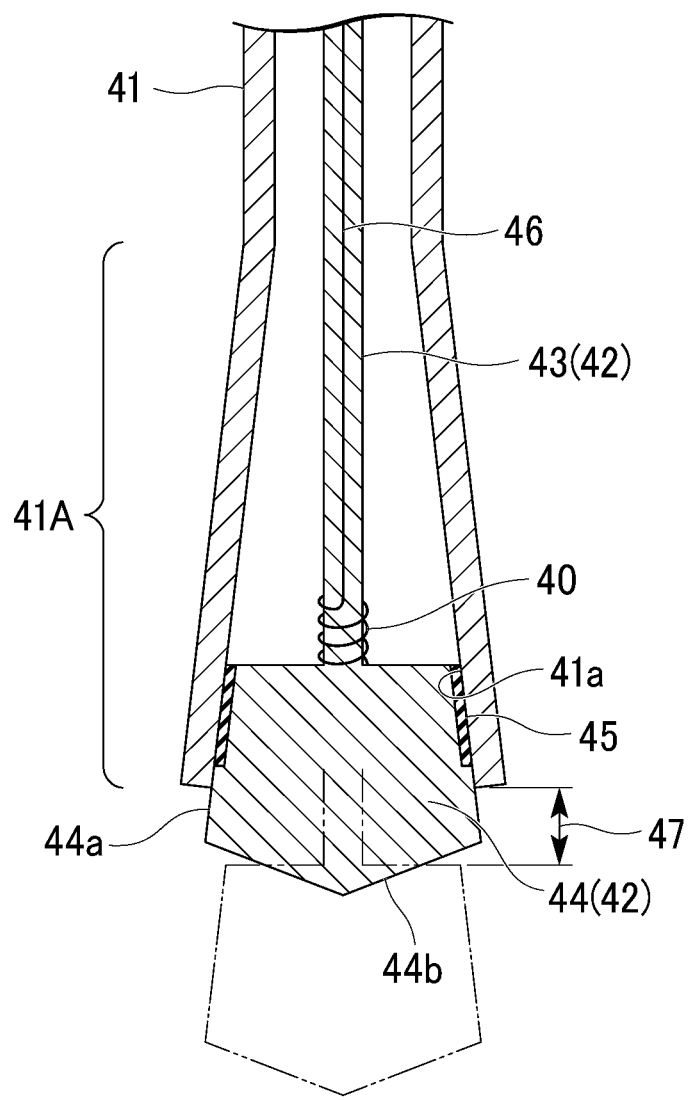
FIG. 12B is a cross-sectional view showing the electrode tube in the nanocarbon separation device of the ninth example embodiment.

FIG. 11 is a perspective view showing a nanocarbon separation device of the present example embodiment. FIG. 12A is a perspective view showing an electrode tube constituting the nanocarbon separation device of the present example embodiment. FIG. 12B is a cross-sectional view showing the electrode tube constituting the nanocarbon separation device of the present example embodiment.

Here, in FIG. 11, components the same as those of the nanocarbon separation device of the first example embodiment shown in FIG. 1 will be denoted with the same reference numerals and redundant descriptions will be omitted. In addition, in FIG. 12A and FIG. 12B, components the same as those of the electrode tube in the nanocarbon separation device of the first example embodiment shown in FIG. 2A and FIG. 2B will be denoted with the same reference numerals and redundant descriptions will be omitted.

A nanocarbon separation device 800 of the present example embodiment includes a separation tank (electrophoresis tank) 20, a first electrode 30 provided at an upper part in the separation tank 20, a second electrode 40 provided at a lower part in the separation tank 20, and a plurality of electrode tubes 50 that extend in the separation tank 20 in the height direction of the separation tank 20.

In the nanocarbon separation device 800 of the present example embodiment, for example, the first electrode 30 is a negative electrode, and the second electrode 40 is a positive electrode. In this case, when a direct current voltage is applied to the first electrode 30 and the second electrode 40, the direction of the electric field is directed from a bottom of the separation tank 20 upward.

The first electrode 30 has the same structure as in the second example embodiment.

As shown in FIG. 12A and FIG. 12B, one end of the tubular member 41, that is, the end (lower end) 41A disposed on the side of the inner bottom surface 20a of the separation tank 20 of the tubular member 41 has a tapered shape whose diameter gradually increases toward the tip (the side of the inner bottom surface 20a of the separation tank 20). The shapes of the tubular member 41 and its lower end 41A have a structure with a small angle, and bubbles generated from the second electrode 40 are unlikely to remain.

In the columnar member 42, one end of the tubular member 41, that is, the tip member 44 disposed at the lower end 41A of the tubular member 41, has a tapered shape whose diameter gradually increases toward the tip (the side of the inner bottom surface 20a of the separation tank 20).

A tip (a part that faces the inner bottom surface 20a of the separation tank 20) 44b of the tip member 44 preferably has a conical shape as shown in FIG. 12B. Thus, even if bubbles are generated at the second electrode 40, bubbles move into the tubular member 41 without remaining at the tip 44b of the tip member 44. Thereby, bubbles can exit the separation tank 20 through the inside of the tubular member 41 of the electrode tube 50.

The nanocarbon separation device 800 of the present example embodiment may include an injection port (not shown) through which the nanocarbon dispersion liquid 80 is injected into the separation tank 20 as in the first example embodiment.

In addition, the nanocarbon separation device 800 of the present example embodiment may include a recovery port (not shown) through which the nanocarbon dispersion liquid 80 in the separation tank 20 is recovered as in the first example embodiment.

The nanocarbon separation device 800 of the present example embodiment preferably includes a temperature adjusting unit configured to keep the temperature of the nanocarbon dispersion liquid 80 in the separation tank 20 constant as in the first example embodiment.

While a case in which the first electrode 30 is a negative electrode and the second electrode 40 is a positive electrode has been provided as an exemplary of the nanocarbon separation device 800 of the present example embodiment, the nanocarbon separation device 800 of the present example embodiment is not limited thereto. In the nanocarbon separation device 800 of the present example embodiment, the first electrode 30 may be a positive electrode and the second electrode 40 may be a negative electrode.

According to the nanocarbon separation device 800 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, it is possible to prevent the occurrence of a convection phenomenon of the nanocarbon dispersion liquid 80 due to oxygen bubbles generated at the second electrode 40 during separation. That is, in separation of nanocarbons, bubbles generated at the second electrode 40, which significantly impair the separation efficiency, can be removed to the outside of the separation tank 20 through the electrode tube 50. As a result, it is possible to separate metallic nanocarbons and semiconducting nanocarbons contained in the nanocarbon dispersion liquid 80 outside the electrode tube 50 in the separation tank 20 quickly and efficiently.

In addition, according to the nanocarbon separation device 800 of the present example embodiment, when the plurality of electrode tubes 50 that extend in the height direction of the separation tank 20 are provided in the separation tank 20, for example, in a step of separating metallic nanocarbons and semiconducting nanocarbons contained in the nanocarbon dispersion liquid 80 which is performed in a nanocarbon separation method to be described below, since a horizontal flow is blocked by the plurality of electrode tubes 50, and thus the occurrence of a horizontal flow in the nanocarbon dispersion liquid 80 can be inhibited, it is possible to separate metallic nanocarbons and semiconducting nanocarbons quickly and efficiently.

In addition, according to the nanocarbon separation device 800 of the present example embodiment, when the first electrode 30 (negative electrode) is provided at an upper part in the separation tank 20 and the second electrode 40 (positive electrode) is provided at a lower part in the separation tank 20, for example, in a step of separating metallic nanocarbons and semiconducting nanocarbons contained in the nanocarbon dispersion liquid 80 which is performed in a nanocarbon separation method to be described below, since the amount of metallic nanocarbons increases near the first electrode 30 and the amount of semiconducting nanocarbons increases near the second electrode 40, it is possible to stably separate metallic nanocarbons and semiconducting nanocarbons.

Here, when the first electrode 30 is a positive electrode and the second electrode 40 is a negative electrode, in a step of separating metallic nanocarbons and semiconducting nanocarbons contained in the nanocarbon dispersion liquid 80, since the amount of semiconducting nanocarbons increases near the first electrode 30 and the amount of metallic nanocarbons increases near the second electrode 40, it is possible to stably separate metallic nanocarbons and semiconducting nanocarbons.

Here, the electrode tube 50 in the present example embodiment can be applied to the above first example embodiment to eighth example embodiment and an eleventh example embodiment to be described below.

(Nanocarbon Separation Method)

A nanocarbon separation method using the nanocarbon separation device 800 will be described and also operations of the nanocarbon separation device 800 will be described with reference to FIG. 11, FIG. 12A, and FIG. 12B.

As in the first example embodiment, the nanocarbon separation method of the present example embodiment includes a step of injecting the nanocarbon dispersion liquid 80 into the separation tank 20 (injection step) and a step of separating metallic nanocarbons and semiconducting nanocarbons contained in the nanocarbon dispersion liquid 80 by applying a direct current voltage to the first electrode 30 and the second electrode 40 (separation step).

In the injection step, when the nanocarbon dispersion liquid 80 is injected into the separation tank 20, the first electrode 710 and the second electrode 40 are brought into contact with the nanocarbon dispersion liquid 80. In the present example embodiment, the first electrode 710 and the second electrode 40 are immersed in the nanocarbon dispersion liquid 80.

According to the nanocarbon separation method of the present example embodiment, when oxygen bubbles generated at the second electrode 40 rise inside the tubular member 41 of the electrode tube 50 and exit the separation tank 20, it is possible to prevent the occurrence of a convection phenomenon of the single-walled carbon nanotube dispersion liquid during separation due to oxygen bubbles generated at the second electrode 40. As a result, it is possible to obtain highly pure metallic single-walled carbon nanotubes and semiconducting single-walled carbon nanotubes.

In addition, according to the nanocarbon separation method of the present example embodiment, in the separation tank 20, since the occurrence of a horizontal flow in the single-walled carbon nanotube dispersion liquid 80 can be inhibited by the plurality of electrode tubes 50, it is possible to separate metallic single-walled carbon nanotubes and semiconducting single-walled carbon nanotubes quickly and efficiently.

In addition, according to the nanocarbon separation method of the present example embodiment, since the amount of metallic single-walled carbon nanotubes increases near the first electrode 30 and the amount of semiconducting single-walled carbon nanotubes increases near the second electrode 40, it is possible to stably separate metallic single-walled carbon nanotubes and semiconducting single-walled carbon nanotubes.

Here, while a case in which the mixture of single-walled carbon nanotubes is separated into metallic single-walled carbon nanotubes and semiconducting single-walled carbon nanotubes has been provided as an exemplary of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 20 and only single-walled carbon nanotubes having desired properties are then recovered may be performed.

In addition, when the first electrode 30 is a positive electrode, and the second electrode 40 is a negative electrode, hydrogen bubbles generated at the second electrode 40 rise inside the tubular member 41 of the electrode tube 50 and exit the separation tank 20, and thus it is possible to prevent the occurrence of a convection phenomenon of the single-walled carbon nanotube dispersion liquid 80 during separation due to hydrogen bubbles generated at the second electrode 40.

Tenth Example Embodiment (Modified Example of Electrode Tube)

Figure 13A:
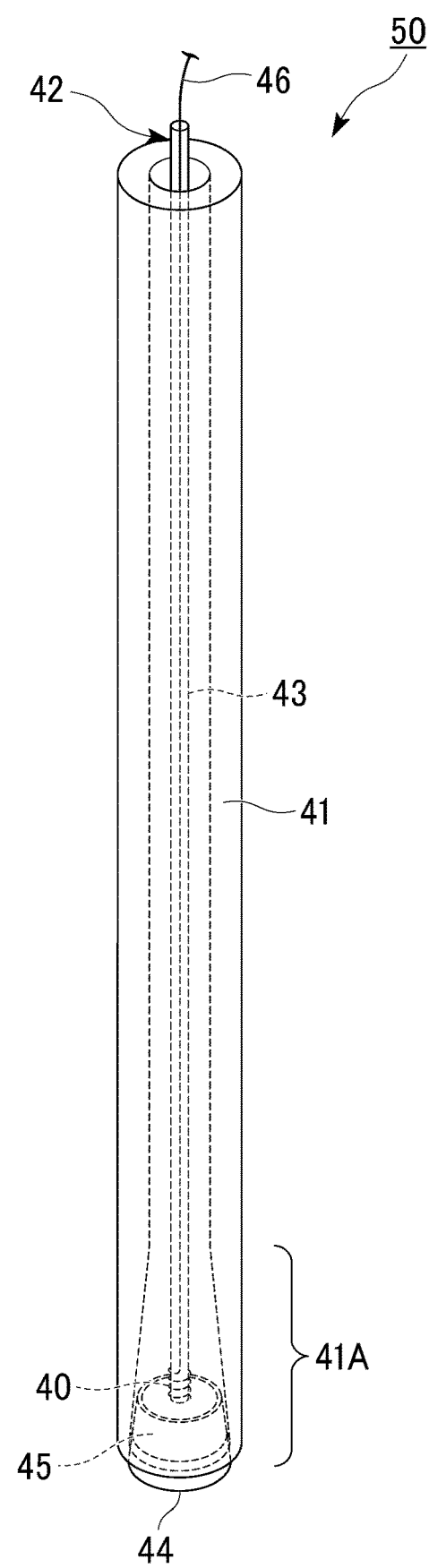
FIG. 13A is a perspective view showing an electrode tube of a tenth example embodiment.
Figure 13B:
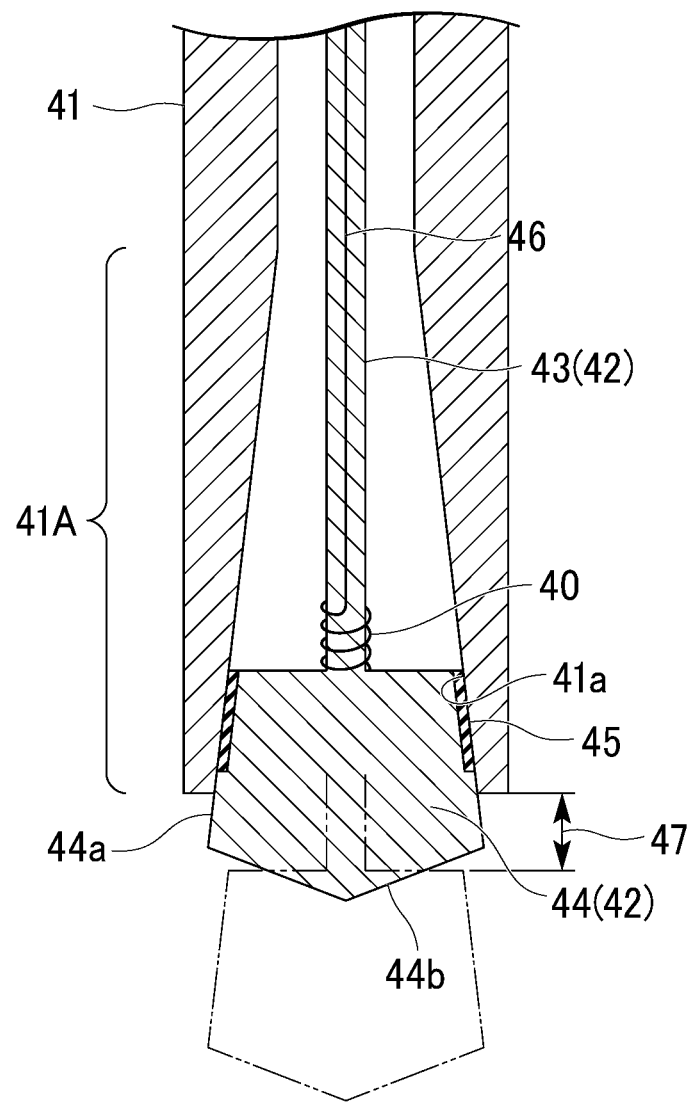
FIG. 13B is a cross-sectional view showing an electrode tube of a tenth example embodiment.

FIG. 13A is a perspective view showing an electrode tube of the present example embodiment. FIG. 13B is a cross-sectional view showing the electrode tube of the present example embodiment.

Here, in FIG. 13A and FIG. 13B, components the same as those of the electrode tube in the nanocarbon separation device of the first example embodiment shown in FIG. 2A and FIG. 2B will be denoted with the same reference numerals and redundant descriptions will be omitted.

As shown in FIG. 12A and FIG. 12B, the inner surface 41a of the lower end 41A of the tubular member 41 has a tapered shape whose diameter gradually increases toward the tip. The shapes of the tubular member 41 and its lower end 41A have a structure with a small angle, and bubbles generated from the second electrode 40 are unlikely to remain.

In the electrode tube 50 of the present example embodiment, since only the inner surface 41a of the lower end 41A of the tubular member 41 has a tapered shape, the tube can be easily produced compared to when the entire lower end 41A of the tubular member 41 is made in a tapered shape like the electrode tube 50 in the ninth example embodiment.

The electrode tube 50 in the present example embodiment can also be applied to the above first example embodiment to eighth example embodiment and an eleventh example embodiment to be described below.

Eleventh Example Embodiment (Nanocarbon Separation Method)

A nanocarbon separation method using the nanocarbon separation device 10 will be described with reference to FIG. 14.

First, water, a single-walled carbon nanotube dispersion liquid in which a mixture of single-walled carbon nanotubes is dispersed in an aqueous solution in which a non-ionic surfactant is dissolved, and an aqueous solution having a non-ionic surfactant amount of 2 wt % are prepared.

Next, for example, water is gently injected into the separation tank 20 from an injection/recovery port (not shown) provided at the lower end of the separation tank 20 using a peristaltic pump or the like.

Next, similarly, the single-walled carbon nanotube dispersion liquid is injected into the separation tank 20.

Next, similarly, the aqueous solution having a non-ionic surfactant amount of 2 wt % is injected into the separation tank 20.

Figure 14:
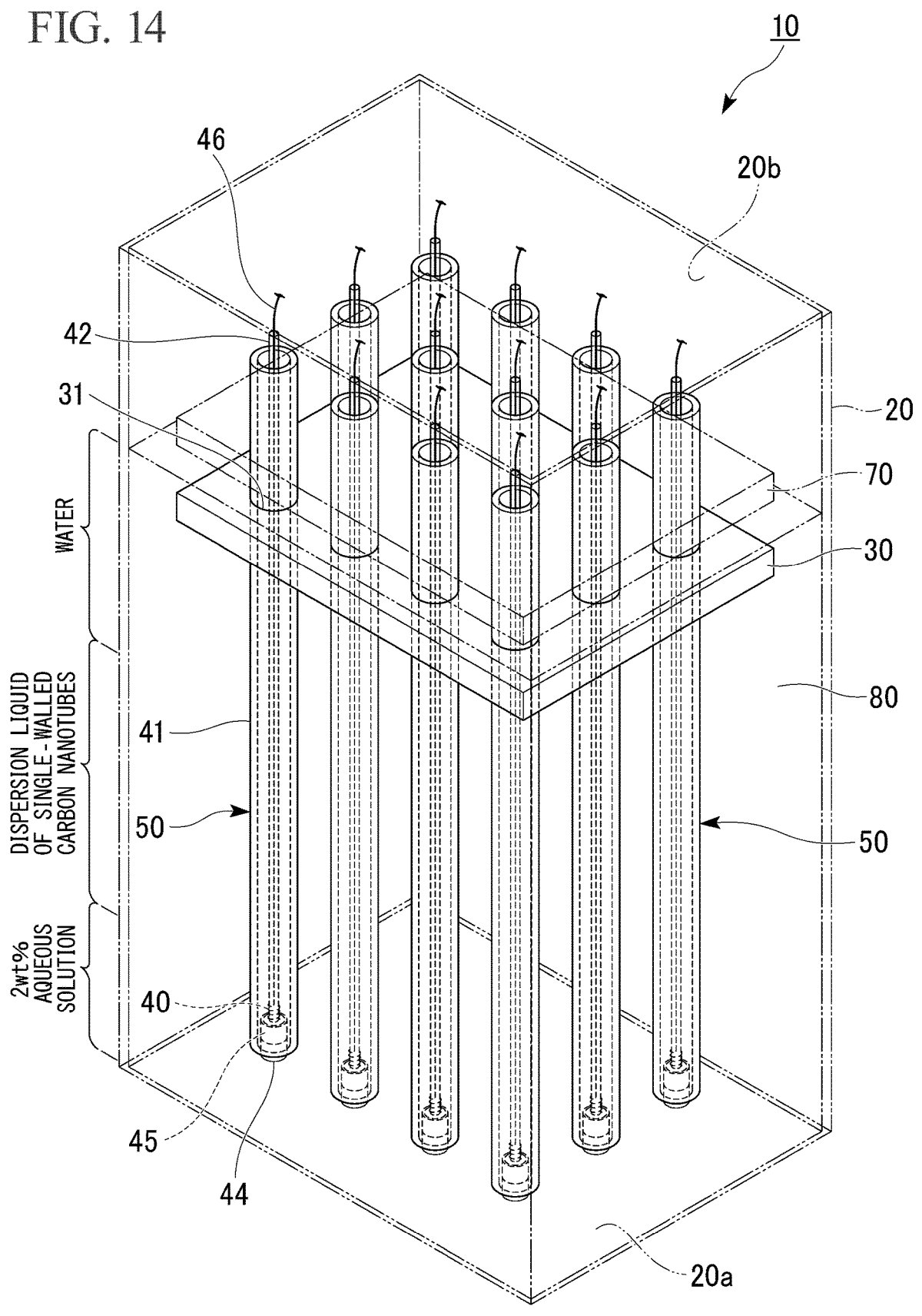

Thereby, as shown in FIG. 14, a three-layer solution lamination structure in which a region in contact with the first electrode 30 is water, a region in contact with the second electrode 40 is a 2 wt % aqueous solution, and an intermediate region is the single-walled carbon nanotube dispersion liquid is formed.

In this case, the first electrode 30 is in contact with only water, and the second electrode 40 is in contact with only the 2 wt % aqueous solution. In addition, the first electrode 30 and the second electrode 40 are not in contact with the single-walled carbon nanotube dispersion liquid.

Hereinafter, as in the first example embodiment, the mixture of single-walled carbon nanotubes contained in the single-walled carbon nanotube dispersion liquid will be separated into metallic single-walled carbon nanotubes and semiconducting single-walled carbon nanotubes.

According to the nanocarbon separation method of the present example embodiment, the movement of the surfactant in the separation tank 20 can be reduced, which is effective in improving the separation efficiency.

The nanocarbon separation method of the present example embodiment can also be applied to the above first to tenth example embodiments.

While the example embodiment that can be applied when the mixture of single-walled carbon nanotubes is separated into metallic single-walled carbon nanotubes and semiconducting single-walled carbon nanotubes has been described above, the present invention can be applied also for separation of a mixture of multi-walled carbon nanotubes, a mixture of double-walled carbon nanotubes, a mixture of graphene, and the like.

INDUSTRIAL APPLICABILITY

According to the nanocarbon separation device of the present invention, in separation of a mixture of nanocarbons, it is possible to remove bubbles generated at the electrode, which significantly impair the separation efficiency.

REFERENCE SYMBOLS

10, 100, 200, 300, 400, 500, 600, 700, 800 Nanocarbon separation device
20 Separation tank
30, 310, 410, 510, 610, 710 First electrode
31, 720 Through-hole
40 Second electrode
41 Tubular member
42 Columnar member
43 Shaft member
44 Tip member
45 O-ring
47 Gap
50 Electrode tube
70, 210 Holding member
80 Nanocarbon dispersion liquid
320 First conductive wire
330 First conductive wire group
340 Second conductive wire
350 Second conductive wire group
360, 480, 490, 560, 660 Annular part
202 First member
203 First member group
204 Second member
205 Second member group
420 First metal plate
430 First metal plate group
440 Second metal plate
450 Second metal plate group
460, 470 Insulating plate
520, 62 First conductor
530, 630 First conductor group
540, 640 Second conductor
550, 650 Second conductor group

The invention claimed is:

1. A nanocarbon separation device, comprising:
a separation tank which is configured to accommodate a dispersion liquid including a nanocarbon;
a first electrode that is provided at an upper part in the separation tank;
a plurality of second electrodes that are provided at a lower part in the separation tank; and
a plurality of electrode tubes that extend in the separation tank in a height direction of the separation tank,
wherein each of the plurality of second electrodes is disposed at a lower end of one of the plurality of electrode tubes, respectively.

2. The nanocarbon separation device according to claim 1, wherein the plurality of electrode tubes are arranged at equal intervals in a plan view of the separation tank.

3. The nanocarbon separation device according to claim 1, wherein the first electrode comprises a conductive wire that connects the plurality of electrode tubes.

4. The nanocarbon separation device according to claim 1, wherein the first electrode comprises a metal plate that connects the plurality of electrode tubes, and an insulating plate is provided below the metal plate.

5. The nanocarbon separation device according to claim 1, wherein the first electrode comprises a mesh-like metal member that holds the plurality of electrode tubes.

6. A nanocarbon separation method using the nanocarbon separation device according to claim 1, the nanocarbon separation method comprising:
injecting a dispersion liquid including a nanocarbon into the separation tank; and
separating metallic nanocarbons and semiconducting nanocarbons included in the dispersion liquid by applying a direct current voltage to the first electrode and the plurality of second electrodes.

* * * * *